(12) United States Patent
Lu et al.

(10) Patent No.: US 8,804,489 B2
(45) Date of Patent: Aug. 12, 2014

(54) FAST FLOODING BASED FAST CONVERGENCE TO RECOVER FROM NETWORK FAILURES

(75) Inventors: Wenhu Lu, San Jose, CA (US); Albert Jining Tian, Cupertino, CA (US)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 478 days.

(21) Appl. No.: 13/091,081

(22) Filed: Apr. 20, 2011

(65) Prior Publication Data

US 2012/0075988 A1 Mar. 29, 2012

Related U.S. Application Data

(60) Provisional application No. 61/447,669, filed on Feb. 28, 2011, provisional application No. 61/406,420, filed on Oct. 25, 2010, provisional application No. 61/387,511, filed on Sep. 29, 2010.

(51) Int. Cl.
*H04L 12/26* (2006.01)
*H04L 12/56* (2006.01)
*H04L 12/24* (2006.01)

(52) U.S. Cl.
CPC ............ *H04L 45/28* (2013.01); *H04L 41/0654* (2013.01)
USPC .......................................... 370/218; 370/254

(58) Field of Classification Search
CPC ......... H04L 45/02; H04L 45/16; H04L 45/28; H04L 45/48; H04L 45/66; H04L 41/0654
USPC ............................ 370/218, 225, 228; 709/236
See application file for complete search history.

(56) References Cited

U.S. PATENT DOCUMENTS

| 6,650,626 B1 | 11/2003 | Cain |
| 6,871,235 B1 | 3/2005 | Cain |
| 6,928,483 B1 | 8/2005 | Cain |
| 7,339,897 B2 | 3/2008 | Larsson et al. |
| 7,702,810 B1 | 4/2010 | Pan et al. |

(Continued)

FOREIGN PATENT DOCUMENTS

| EP | 1 107 507 A2 | 6/2001 |
| EP | 1107507 | 6/2001 |

OTHER PUBLICATIONS

Final Office Action, U.S. Appl. No. 12/983,126, dated Apr. 24, 2013, 23 pages.

(Continued)

*Primary Examiner* — Pao Sinkantarakorn
*Assistant Examiner* — Richard K Chang
(74) *Attorney, Agent, or Firm* — Blakely Sokoloff Taylor & Zafman LLP

(57) ABSTRACT

A router detects a network failure and responsive to that failure, floods a fast failure notification message out a set of interfaces of the router. The fast failure notification message includes information that identifies the network failure and includes as its source MAC (Media Access Control) address a MAC address that is assigned to an interface that is coupled with the detected network failure and is not part of the set of interfaces of the router. The router updates a routing table to reflect the network failure. The flooding of the fast failure notification message is performed prior to completion of the routing table update to reflect the network failure.

30 Claims, 16 Drawing Sheets

(56) References Cited

U.S. PATENT DOCUMENTS

| | | | |
|---|---|---|---|
| 7,860,024 B1 | 12/2010 | Greenberg et al. | |
| 2002/0167900 A1 | 11/2002 | Mark et al. | |
| 2004/0122976 A1* | 6/2004 | Dutta et al. | 709/245 |
| 2006/0291391 A1 | 12/2006 | Vasseur et al. | |
| 2007/0127395 A1* | 6/2007 | Jain et al. | 370/254 |
| 2008/0037436 A1 | 2/2008 | Liu | |
| 2008/0062862 A1* | 3/2008 | Goyal et al. | 370/218 |
| 2008/0170550 A1* | 7/2008 | Liu et al. | 370/338 |
| 2008/0279103 A1* | 11/2008 | Yong et al. | 370/235 |
| 2009/0252033 A1* | 10/2009 | Ramakrishnan et al. | 370/228 |
| 2011/0280123 A1* | 11/2011 | Wijnands et al. | 370/228 |

OTHER PUBLICATIONS

Non-Final Office Action, U.S. Appl. No. 12/983,126, dated Nov. 21, 2012, 24 pages.

Cain, B., "Fast Link State Flooding", Institute of Electrical and Electronics Engineers, GLOBECOM'OO. 2000 IEEE Global Telecommunications Conference. San Francisco. CA. Nov. 27-Dec. 1, 2000; New York. NY: IEEE. US. vol. 1.Nov. 27, 2000, pp. 465-469.

Francois, et al., "Achieving Sub-Second IGP Convergence in Large IP Networks", ACM. 2 Penn Plaza. Suite 701—New York USA. Jul. 2, 2005.

Chain B.—Institute of Electrical and Electronics Engineers: "Fast Link State Flooding". GLOBECOM'OO. 2000 IEEE Global Telecommunications Conference. San Francisco. CA. Nov. 27-Dec. 1, 2000; New York. NY: IEEE. US. vol. 1.Nov. 27, 2000. pp. 465-469, 5 pages.

Francois et al. "Achieving Sub-Second IGP Convergence in Large IP Networks", ACM. 2 Penn Plaza. Suite 701—New York USA. Jul. 2, 2005, 10 pages.

Non-Final Office Action, U.S. Appl. No. 12/983,126, dated Jul. 29, 2013, 22 pages.

Notice of Allowance, U.S. Appl. No. 12/983,126, Sep. 12, 2013, 16 pages.

* cited by examiner

FAST FLOODING BASED FAST CONVERGENCE TO RECOVER FROM NETWORK FAILURES

CROSS-REFERENCE TO RELATED APPLICATIONS

This application claims the benefit of U.S. Provisional Application No. 61/447,669, filed Feb. 28, 2011, U.S. Provisional Application No. 61/406,420, filed Oct. 25, 2010, and U.S. Provisional Application No. 61/387,511, filed Sep. 29, 2010, which are each hereby incorporated by reference.

FIELD

Embodiments of the invention relate to the field of networking; and more specifically, to fast convergence from network failures.

BACKGROUND

The ability to recover rapidly from network failures is one of the most sought network characteristics. There are few solutions that address this issue to satisfaction. One such solution is IP Fast Re-Route (IPFRR) described in RFC (Request For Comments) 5714. IPFRR mimics the solution of MPLS-FRR (Multi-Protocol Label Switching-Fast Re-Route), with the exception that MPLS-FRR is path based, or source routing based in other words. This implies that the re-route decision can be carried out by the PLR (point-of-local-repair) router alone, without cooperation of other LSRs (Label Switched Routers) in the network. IP based FRR, however, is by nature not source routing based. As a result, its re-route decision may not be honored by other routers in the network which can lead to severe consequences such as traffic outage or routing loops.

There have been several methods proposed around the IPFRR concept. One method is LFA (Loop Free Alternative) described in RFC 5286. The LFA approach requires a great amount of computation and has coverage issues. Another method is Not-Via, described in IETF draft "draft-ietf-rtgwg-ipfrr-notvia-address-06", Oct. 21, 2010. The Not-Via approach is complicated and is prohibitive to be useful. The primary reason for difficulties in the approaches proposed around the IPFRR concept is evident from the following passage of RFC 5714, first paragraph, section 1: "However, there is an alternative approach, which is to compute backup routes that allow the failure to be repaired locally by the router(s) detecting the failure without the immediate need to inform other routers of the failure." The phrase "without the immediate need to inform other routers of the failure" is against the nature of the IP network in which the domain-wide synchronization is the key.

In general, in normal link state routing operations, upon a router detecting a link failure or other network disruption, the router floods a notification to all of its surrounding neighbor routers, which after some processing (e.g., updating the routing and/or forwarding table), propagate the information further to other routers until every router is updated and synchronized. This flooding mechanism is slow and takes a relatively long amount of time to complete and is dependent to the network structure and size.

SUMMARY

A fast flooding based fast convergence architecture is described. In one embodiment, the delivery mechanism for fast failure notification messages is bridged based. A router for initiating bridged based fast flooding based fast convergence detects a network failure, and responsive to that failure, floods a fast failure notification message out a set of one or more interfaces of the router. The fast failure notification message includes information that identifies the network failure and includes as its source MAC (Media Access Control) address a MAC address that is assigned to an interface that is coupled with the detected network failure and is not part of the set of interfaces of the router. The router updates a routing table to reflect the network failure. The transmission of the fast failure notification message is performed prior to completion of the routing table update to reflect the network failure. In one embodiment, the fast failure notification message indicates to a receiving router that it is to determine in its data transport layer whether to flood that fast failure notification message out a set of one or more of its interfaces before it determines whether to update its routing table. In one embodiment, the initiating router for the bridged based fast flooding includes a data transport layer and an application layer. The data transport layer includes a Fast Failure Notification (FFN) module configured to, in response to a detected network failure, flood the fast failure notification message out one or more of its interfaces. The application layer includes a routing protocol module that is configured to update the routing table in response to the detected network failure.

A router for receiving bridged based fast failure notification messages is described. Responsive to receiving a fast failure notification message on an interface, and responsive to determining that a source MAC address of the fast failure notification message is not associated with the interface, the router adds the source MAC address and interface pair to a bridge MAC table of the router, floods the fast failure notification message to one or more other interfaces for transport to one or more other routers, and updates a routing table to reflect the network failure. The flooding of the fast failure notification message is performed prior to completion of the step of updating the routing table to reflect the network failure. In one embodiment, the receiving router for the bridged based fast flooding includes a data transport layer and an application layer. The application layer includes a routing protocol module that is configured to manage a routing table. The data transport layer includes a bridge MAC table to store associations of MAC addresses and interfaces and a FFN module that is configured to, in response to a received fast failure notification message and responsive to determining that its source MAC address is not associated with the interface in which the message was received, associate the source MAC address with that interface, flood the fast failure notification message to one or more other interfaces, and send the fast failure notification message to the routing protocol module to update the routing table to reflect the network failure. The FFN module floods the fast failure notification message prior to the routing protocol module completing its update of the routing table.

In one embodiment, the delivery mechanism for fast failure notification messages is via a layer 2 bridged network that uses a spanning tree protocol (STP). A router that initiates fast flooding based fast convergence detects a network failure, and responsive to that failure, floods a layer 2 fast failure notification message out one or more interfaces, and updates its routing table to reflect the network failure. The fast failure notification message includes information that identifies the network failure and indicates to a router that receives the fast failure notification message to flood the fast failure notification message out its interfaces that are not blocked by STP independently of updating its routing table to reflect the network failure. In one embodiment, the router includes a data transport layer and an application layer. The data transport layer includes a Fast Failure Notification (FFN) module configured to, in response to a detected network failure, flood the layer 2 fast failure notification message out one or more of its interfaces. The application layer includes a routing protocol module that is configured to update the routing table in response to the detected network failure.

A router for receiving and responding to fast failure notification messages received in a layer 2 bridged network is also described. The router receives a fast failure notification message that includes information that identifies a network failure. The router floods the fast failure notification message out one or more of its interfaces that are not blocked by STP and updates a routing table to reflect the network failure. The router floods the fast failure notification message prior to completion of the update to the routing table to reflect the network failure. In one embodiment, the router includes a data transport layer and an application layer. The application layer includes a routing protocol module that is configured to manage a routing table. The data transport layer includes a FFN module that is configured to, in response to receiving a fast failure notification message, flood that message out one or more interfaces that are not blocked by STP and send the message to the routing protocol module on the application layer to update the routing table to reflect the network failure.

In one embodiment, the delivery mechanism for fast failure notification messages is unicast based. A router detects a network failure, and responsive to that failure, transmits a fast failure notification message that includes information that identifies the network failure to each other router that is in a same domain as the router, and updates a routing table to reflect the network failure. The fast failure notification message is transmitted to those routers independently of updating the routing table to reflect the network failure. In one embodiment, the router includes a data transport layer and an application layer. The application layer includes a routing protocol module that is configured to update the routing table. The data transport layer includes a FFN module that is configured to, in response to a detected network failure, transmit a fast failure notification message to each other router that is in the same domain as the router.

A router for receiving and responding to unicast based fast failure notification messages is also described. In one embodiment, the router receives a unicast fast failure notification message that includes information that identifies a network failure, bypasses an adjacency check for the fast failure notification message, and updates a routing table to reflect the network failure. In one embodiment, the router includes an interface that is configured to receive and send unicast fast failure notification messages to a routing protocol module that bypasses the adjacency check for those fast failure notification messages and updates a routing table to reflect the network failures in the fast failure notification messages.

In one embodiment, the delivery mechanism for fast failure notification messages is multicast based. A router detects a network failure, and responsive to that failure, transmits a fast failure notification message to a multicast group address. The fast failure notification message includes information that identifies the network failure and further indicates to each of a plurality of routers that have joined the multicast group and will receive the fast failure notification message to determine whether to multicast the fast failure notification message to its interfaces independently of that router updating its routing table. The router also updates its routing table to reflect the network failure. The router transmits the fast failure notification message independently of updating the routing table to reflect the network failure. In one embodiment, the router includes a data transport layer and an application layer. The application layer includes a routing protocol module that is configured to update a routing table in response to the detected network failure. The data transport layer includes an FFN module that is configured to, in response to a detected network failure, transmit the fast failure notification message to a multicast group address.

A router for receiving and responding to multicast based fast failure notification messages is also described. In one embodiment, the router performs a RPF (Reverse Path Forwarding) check upon receiving a fast failure notification message. The router joins a multicast group and receives a fast failure notification message addressed to an address associated with the multicast group. Responsive to determining that the interface in which the fast failure notification message was received on is the same interface used by the router to reach a source router of the fast failure notification message, the router multicasts the message to at least one other interface. The router updates the routing table to reflect the network failure. The router multicasts the fast failure notification message prior to completion of the routing table update. In one embodiment, the router includes a data transport layer and an application layer. The data transport layer includes a FFN module that is configured to, in response to receiving the fast failure notification message and responsive to determining that the interface in which the message was received on is the same interface used to reach the source router of the message, multicast that message to other ones of its interfaces and send the message to a routing protocol module on the application layer to update the routing table.

In one embodiment, a router receiving a multicast based fast failure notification message uses a shortest path first (SPF) tree (SPT) when multicasting the fast failure notification message. The router elects one of multiple routers in the same network to be a root node of the SPT and constructs the SPT using the current network topology. The router joins a multicast group and receives a fast failure notification message addressed to an address associated with the multicast group. The router multicasts the fast failure notification message according to the SPT and updates the routing table to reflect the network failure indicated in the fast failure notification message. The router multicasts the fast failure notification message according to the SPT prior to completion of updating the routing table. In one embodiment, the router includes an application layer and a data transport layer. The data transport layer includes the SPT and a FFN module that is configured to, in response to receipt of a fast failure notification message, multicast the message according to the SPT and send the message to a routing protocol module on the application layer to update the routing table to reflect the network failure.

In one embodiment, a router receiving a multicast based fast failure notification message uses a bidirectional multicast tree that is built using a PIM (Protocol Independent Multicast) protocol implementation. The router builds the bidirectional tree using PIM and joins a multicast group. The router receives a fast failure notification message addressed to an address associated with that multicast group and includes information that identifies a network failure, multicasts the message according to the bidirectional multicast tree, and updates a routing table to reflect the network failure. The router multicasts the fast failure notification message according to the bidirectional multicast tree prior to completion of the update of the routing table. In one embodiment, the router includes an application layer and a data transport layer. The data transport layer includes the bidirectional multicast tree built using PIM and a FFN module that is configured to, in response to receiving a fast failure notification message, multicast that message according to the bidirectional multicast tree and send the fast failure notification message to a routing protocol module on the application layer to update the routing table.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
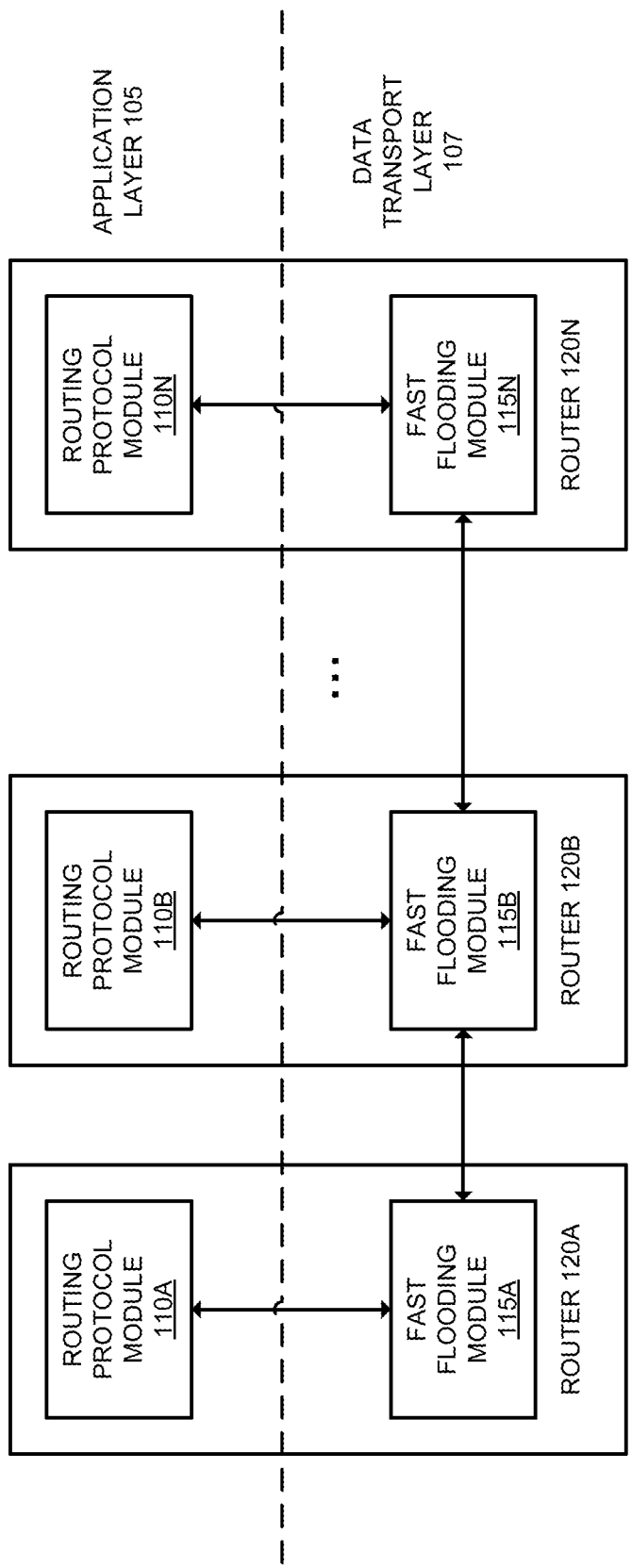
FIG. 1 illustrates a fast flooding based fast convergence (FFFC) architecture embodied on routers in a network according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A fast flooding based fast convergence (FFFC) architecture is described. The FFFC architecture minimizes the network downtime in the event of a network failure (e.g., upon a link or equipment failing). In one embodiment of the invention, the FFFC architecture uses an event framework for the purpose of rapid dissemination of events to all interested receivers in the network. The event framework is independent of the underlying delivery mechanisms. Thus, different delivery mechanisms with different properties suitable for different requirements may be used. For example, some delivery mechanism(s) that are optimized for simplicity may be used, while other delivery mechanism(s) that improve reliability may be used.

The event framework is application independent in that multiple different applications can generate the events and/or register to receive the events. In one embodiment, a TLV (type-length-value) based event framework is used to ensure between the applications and the delivery mechanisms. One example of an application using the event framework is a Fast Failure Notification. The Fast Failure Notification is used to improve network convergence time. For example, when a failure occurs in the network, routers adjacent to the failure can detect it and quickly disseminate the failure notifications to other routers throughout the area. Routing protocols (e.g., link state IGP (Interior Gateway Protocol) routing protocols such as OSPF (Open Shortest Path First) and Intermediate System to Intermediate System (IS-IS)) on different routers can register and receive such failure notifications, then quickly react to the failure to achieve fast convergence. The event in the Fast Failure notification is a link-down event or a node-down event. The up events (e.g., link-up or node-up) are not flooded for the same of network stability.

FIG. 1 illustrates a fast flooding based fast convergence (FFFC) architecture embodied on routers in a network according to one embodiment. The exemplary FFFC architecture is a layered structure in which various routing functions are arranged on each of the routers. As illustrated in FIG. 1, the FFFC architecture includes the application layer 105 and the data transport layer 107. The application layer 105 includes routing protocol specific functionality and is typically part of the control plane of the respective routers. The data transport layer 107 includes functionality for the fast flooding mechanism described herein (e.g., it is responsible for the rapid dissemination of network events to all interested receivers in the network) and is typically part of the data plane of the respective routers. Specifically, the application layer 105 includes the routing protocol modules 110A-N on the routers 120A-N respectively, and the data transport layer 107 includes the fast flooding modules 115A-N on the routers 120A-N respectively.

The routing protocol modules 110A-N are registered to receive events from the fast flooding modules 115A-N respectively. In one embodiment, the fast flooding module allows a router 120 to disseminate a network failure notification to other router(s) 120 in the network, which can then forward to the corresponding routing protocol module 110 for further processing (e.g., updating the routing table and/or forwarding table). Thus, the fast flooding mechanism is detached from the application layer 105 and moved onto the data transport layer 107.

Although regular routing protocol processing for recovering from network failures, which performs flooding in a store-and-forward manner, is reliable (e.g., includes retransmission) and secure (e.g., includes an adjacency check), it involves control plane operation and control plane to data plane communication, which slows down the network-wide convergence. However, the FFFC architecture described herein detaches the flooding of the network failure notification from the application layer 105 and moves it onto the data transport layer 107. Thus, the data transport layer 107 provides a domain-wide fast flooding platform that can deliver routing control messages at data traffic speed so that the entire routing domain can realize domain wide fast convergence. In one embodiment, the normal flooding function is still included in the application layer to ensure ultimate synchronization in case the fast flooding notifications do not reach the intended routers. The normal flooding function requires that the routing table and forwarding table be updated before a failure notification message is transmitted.

Figure 2:
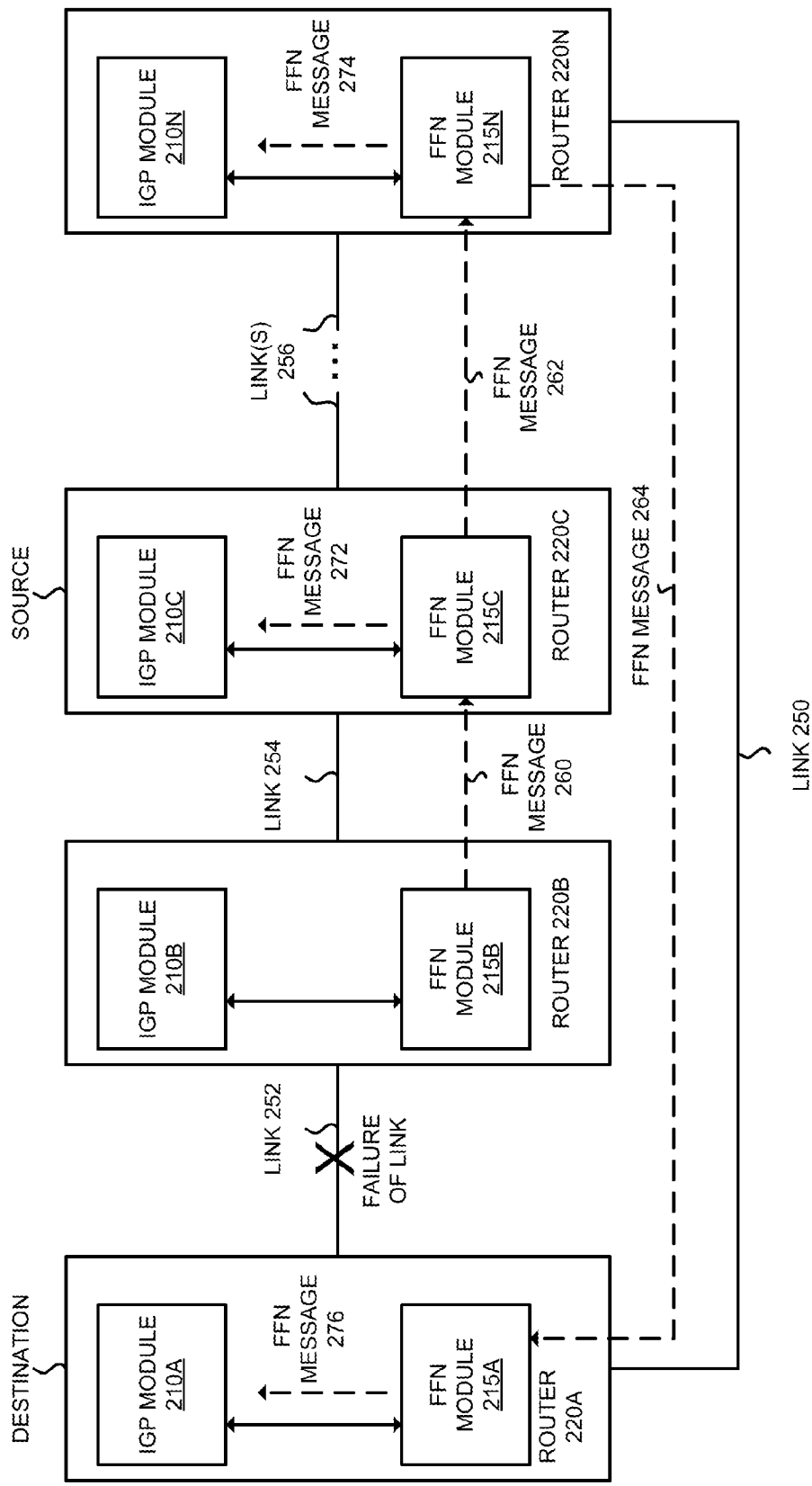
FIG. 2 illustrates an exemplary network using a Fast Failure Notification application that uses the FFFC architecture according to one embodiment

FIG. 2 illustrates an exemplary network using a Fast Failure Notification application that uses the FFFC architecture according to one embodiment. The exemplary network includes the routers 220A-N and form a ring topology. The router 220A and the router 220B are coupled by the link 252. The router 220B and the router 220C are coupled by the link 254. The router 220C and the router 220N are coupled by the link(s) 256 (there may be zero or more routers between the router 220C and the router 220N). The router 220N and the router 220A are coupled by the link 250. The routers 220A-N include the IGP module 210A-N and the Fast Failure Notification (FNN) module 215A-N respectively. The IGP modules 210A-N are part of the application layer of the routers 220A-N respectively and the FFN modules 215A-N are part of the data transport layer of the routers 220A-N respectively.

In the example illustrated in FIG. 2, the router 220C is the source of packets destined to the router 220A. During normal operation, the packets take the path from router 220C through the router 220B to reach the destination router 220A. As illustrated in FIG. 2, the network has experienced a network failure; specifically, the link 252 has failed. As a result, the router 220B cannot forward packets to the router 220A over the link 252. Thus, the packets from the router 220C will not reach the destination router 220A through the router 220B. However, the packets from the router 220C can reach the destination router 220A through the router 220N.

For purposes of explanation, the router 220B detects the failure of the link 252. It should be understood, however, that the router 220A may also detect the failure. The detection of the failure may be performed in different ways in different embodiments. In one embodiment, Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. The detection of the failure of the link 252 is an event in the event framework. Thus, a message is sent to the IGP module 210B that notifies the IGP module 210B of the failure of the link 252 and the IGP module 210B can update the routing table and forwarding table of the router 220B to reflect the failure of the link 252.

Since the router 220B detects the failure, in one embodiment it initiates the FFFC process and is the starting point for the fast failure notification message flooding. Thus, sometime after detecting the failure, the router 220B originates a fast failure notification message that indicates a failure on the link 252. The fast failure notification message is used to notify other routers that have registered to receive messages of that type of the failure. For example, the fast failure notification message indicates that there is a failure on the link 252. In addition, the fast failure notification message also indicates to the receiving routers that the fast flooding process should be performed including forwarding the fast failure notification message to their next hop(s) without waiting for convergence. For example, the fast failure notification message is to be forwarded by those router(s) without interaction from their application layer. For purposes of FIG. 2, each of the routers 220A-N have registered to receive fast failure notification messages.

In one embodiment, the fast failure notification message uses the existing IGP PDU (Protocol Data Unit) packet format. For example, if the IGP is OSPF, the OSPF Router-LSA (link state advertisement), which reflects a broken adjacency (one few router link) can be used as the fast failure notification message and fast-flooded to the routers without special modification. This allows the receivers, for example the routers 220A and 220C-N, to process the packet in their usual way. In addition, since the packet is not different than one used in normal flooding, it guarantees that the transition will be seamless when the normal flooding catches up to the fast flooding described herein. In addition, using the normal packet means that there will not be duplicate effort between fast and slow convergence. In other words, flooding stops wherever a router is updated (e.g., already fast flooded the fast failure notification message). However, using the existing IGP PDU packet format for the fast failure notification message means that the message cannot be made uniform for multiple protocols. For example, the existing IGP PDU packet format for OSPF is different than that of IS-IS. Thus, for IS-IS, a different format has to be used than for OSPF. In addition, since IS-IS PDU is not IP based, it may require encapsulation in some cases. Furthermore, one of the drawbacks is that the normal IGP flooding mechanism uses adjacency check to prevent a DoS (Denial of Service) attack or PDU replay from un-trusted parties. In order for the fast failure notification messages to be accepted, this adjacency check needs to be bypassed, which opens the door to DoS attacks or PDU replay attacks. However, domain-wide authentication may be used in order to protect against these types of attacks.

Figure 21:
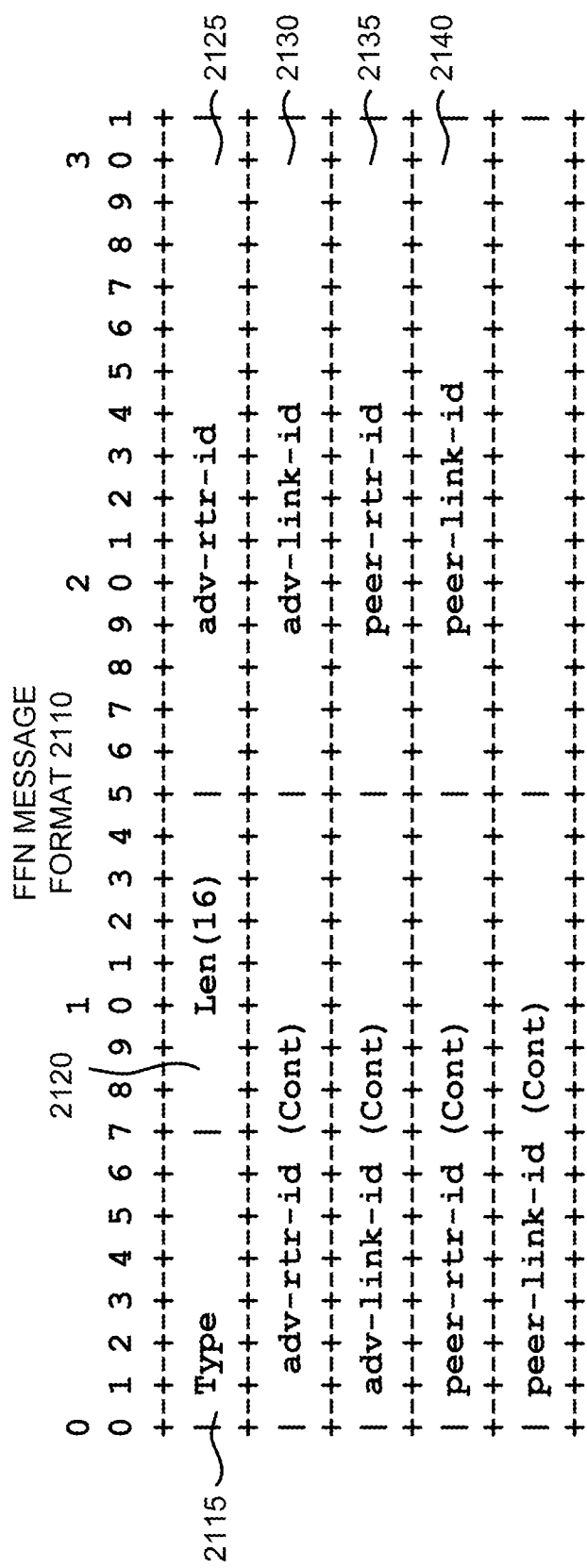
FIG. 21 illustrates an exemplary format for a fast failure notification message according to one embodiment.

In another embodiment, the fast failure notification message uses a common message format regardless of protocol. This format allows for sufficient information about the failed link and is treated on the receiver router as a local event in the event framework described herein. In one embodiment, the uniform format is TLV-based. In one embodiment, timeout machinery is used to protect against cases where the fast failure notification message using a common message format is mistakenly flooded due to a bug or other error condition. FIG. 21, which will be described in greater detail later herein, illustrates an exemplary message format that is independent of IGP protocols and is a layer 2 protocol packet that is issued by the data transport layer.

In one embodiment, the fast failure notification message includes a specific destination IP address or MAC address that indicates to the receiving routers that the message is for the FFFC architecture described herein.

After originating the fast failure notification message, the detecting router 220B floods the fast failure notification message. As illustrated in FIG. 2, the router 220B floods the fast failure notification message 260 to the router 220C over the link 254. This is conceptually illustrated as being sent from the FFN module 215B to the FFN module 215C. Any number of mechanisms to perform the fast flooding may be used. In one embodiment, the flooding mechanism that is used is reliable (it reaches all participants even after failures occur), loop-free, simple, and can be authenticated.

In one embodiment, the router 220B generates and transmits the fast failure notification message 260 before the router 220B has finished updating its routing and forwarding tables to reflect the failure of the link 252 (before it is converged). Thus, the router 220B generates and transmits the fast failure notification message independently of updating its routing and forwarding tables.

The receiving router 220C receives the fast failure notification message 260. The notification message 260 is an event in the event framework described herein and the IGP module 210C is registered to receive messages for the event. In one embodiment, the fast failure notification message 260 is identified as a message for the FFFC architecture based on it having a specific destination IP address or MAC address. Thus, after receiving the message, it forwards the fast failure notification message 272, which indicates a failure of the link 252, to its IGP module 210C so that the IGP module 210C can react to the failure and begin convergence processing. In one embodiment, the IGP module 210C relaxes its acceptance criteria of the message by foregoing the adjacency check. After receiving the fast failure notification message 272, the IGP module processes the message including updating the routing table and forwarding table as appropriate to reflect the failure of the link 252. In one embodiment, the changes are pre-downloaded to the data plane (e.g., in the forwarding table) to improve convergence time.

In addition to forwarding the fast failure notification message 272 to the IGP module 210C, the FFN module 215C floods a copy of the fast failure notification message. For exemplary purposes, the FFN module 215C floods the fast failure notification message 262 to the router 220N over the link 256. The fast failure notification message 262 can be sent before or concurrently with the fast failure notification message 272. Thus, the fast failure notification message 262 is flooded to the next router without any interaction with the IGP module 210C according to one embodiment, which reduces the convergence time.

The processing performed by the router 220N in response to receiving the fast failure notification message 262 is similar to the processing performed by the router 220C in response to receiving the fast failure notification message 260. The fast failure notification message 262 is an event in the framework that the IGP module 210N is registered for. Thus, the FFN module 215N sends the fast failure notification message 274, which indicates a failure of the link 252, to the IGP module 210N. The IGP module 210N then updates the routing table and forwarding table as appropriate to reflect the failure of link 252. The FFN module 215N also floods the fast failure notification message 264 to the router 220A over the link 250. The fast failure notification message 264 can be forward before or concurrently with the forwarding of the fast forwarding message 274. Responsive to receiving the fast failure notification message 220A, the fast flooding mechanism 215A forwards the fast failure notification message 276 to the IGP module 210A so that the IGP module 210A can react to the notification and failure of the link 252.

In one embodiment, the fast failure notification messages 260, 262, and 264 are transmitted at the same speed as data traffic since they are processed at the data transport layer. By way of a specific example, the fast failure notification message 262 sent from the router 220C to the router 220N over the link 256 travels at the same speed as data traffic sent from the router 220C to the router 220N over the link 256. Since the fast failure notification messages 260, 262, and 264 travel at the same speed as data traffic, the next-hop router has the same amount of time for processing the notification message as the previous router, assuming the same computing power. For example, the router 220N has the same amount of time for processing the notification message 262 as the router 220C has for processing the notification message 260 assuming that the routers 220C and 220N have the same computing power.

It should be understood that the routers 220A-N do not converge at the same time. This is due to the propagation delay of the fast failure notification messages. For example, the router 220C will receive a fast failure notification message that indicates the failure of the link 252 before the router 220N receives a similar message. However, using the FFFC architecture described herein, the traffic loss stops immediately after the first router repairs. This is because the data traffic experiences the same propagation delay as the fast failure notification messages, which compensates the late starting of convergence at remote routers.

By way of example, assume that the routers 220A-N each have a convergence time of 50 milliseconds, and a transmission delay of 20 milliseconds over each hop. Convergence time is measured by dividing the number of lost packets with the traffic flow rate between any two routers in the domain. This should equal to the domain wide network convergence time if all the individual routers have the same computing power and the same convergence time. For example, upon the link 252 failure, the router 220B sends the fast forwarding notification message 260 (e.g., a Link State Update) to the router 220C and begins its convergence. Table 1 below shows the convergence timeline.

TABLE 1

| Node | Convergence Start | Convergence Completes |
|---|---|---|
| 220B | 0 | 50 ms |
| 220C | 20 ms | 70 ms |

At a time 0, the router 220B begins its convergence after the failure of the link 252. In addition, the router 220B concurrently sends the fast forwarding notification message 260 to the router 220C. During the first 50 milliseconds, packets from the router 220B to the router 220A over the link 252 are dropped (due to the failure of the link 252). The fast forwarding notification message 260 arrives at the router 220C after 20 milliseconds, at which point the router 220C begins its convergence. Thus, the router 220C begins its convergence before the router 220B finishes its convergence. The router 220C also sends the fast failure notification message 262 to the next hop router (e.g., the router 220N). Substantially immediately after 50 milliseconds and the router 220B has converged, the router 220B re-routes the packets that are destined to the router 220A towards the router 220C. Those packets take 20 milliseconds to arrive at the router 220C, and thus will arrive 70 milliseconds after the failure of the link 252. The router 220C converges 50 milliseconds after receiving the fast forwarding notification message 260, which is 70 milliseconds after the failure of the link 252. Thus, the data traffic packets will arrive at approximately the same time that the router 220C converges. This process continues domain-wide. Since the router 220C and all the other downstream routers converge one by one right before the data packets will arrive, the data packets arrive at the destination (the router 220A) via the corrected path successfully.

If the routers 220A-N have a different convergence time, micro-looping may form, although the packets will still be delivered after one or more loops. For example, assume the same link failure scenario (the link 252 has failed) but that the router 220C needs 90 milliseconds to converge while the other routers converge in 50 milliseconds. When the router 220B re-routes the packets to the router 220C at 70 milliseconds after the failure of the link 252, the router 220C will not have completed its updating yet. Thus, it may still be continuing to use its old forwarding table and send packets destined for the router 220A to the router 220B, which will in turn re-route those packets back to the router 220C. The time these packets will arrive at the router 220C is 110 milliseconds after the failure and the router 220C will have finished updating and will forward the packets correctly. In this example, the packets are looped once, however it should be understood that there may be multiple loops in some circumstances. Packets may be reordered due to the different convergence timeline causing packets to be temporarily forwarded in the wrong direction. Packet reordering affects TCP communication adversely in that new sequence numbered packets may arrive ahead of the older ones.

The FFFC architecture described herein, allows the data traffic to be re-routed as soon as the affected router converges, as opposed to all of the routers convergence. In addition, upon the convergence of the affected router, the FFFC architecture described herein guarantees correct routes for all affected traffic. The FFFC architecture described herein scales with networks of any size and any topology, at least not inferior to the normal IGP flooding.

Figure 3:
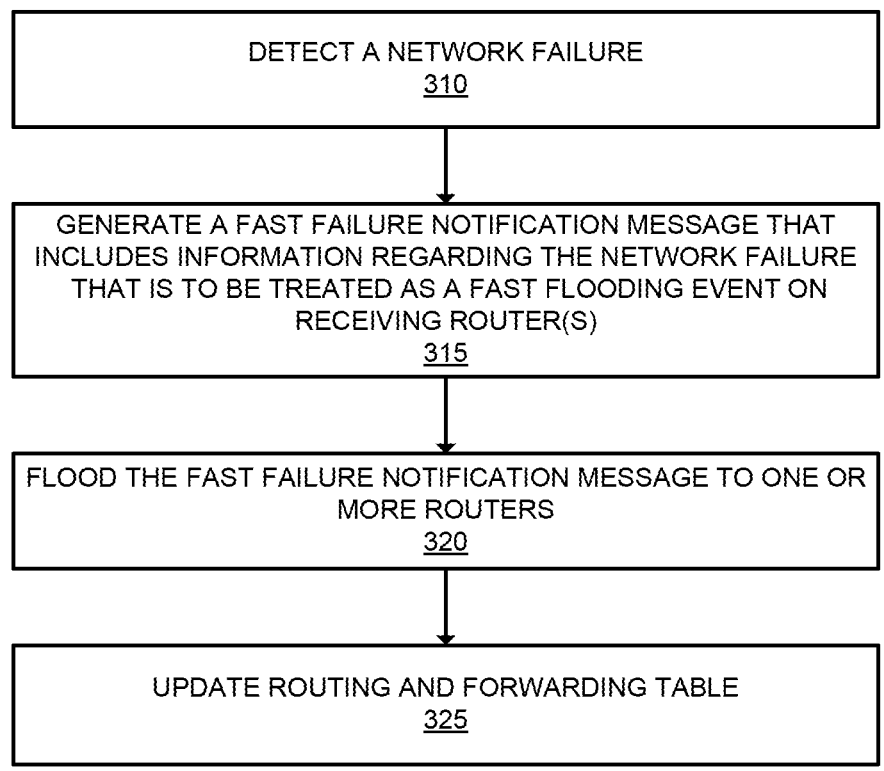
FIG. 3 is a flow diagram that illustrates exemplary operations performed by a router that detects a network failure to initiate the domain-wide FFFC according to one embodiment.

FIG. 3 is a flow diagram that illustrates exemplary operations performed by a router that detects a network failure to initiate the domain-wide FFFC according to one embodiment. At operation 310, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 315.

At operation 315, the router generates a fast failure notification message that includes information regarding the network failure. The fast failure notification message is to be treated as a fast flooding event on the receiving router(s). In addition, the fast failure notification message also indicates to the receiving router(s) that the fast flooding process should be performed including forwarding the fast failure notification message to their next hop(s) without waiting for convergence (without waiting for the routing and forwarding tables to be updated). For example, the fast failure notification message is to be forwarded by those router(s) without interaction from their application layer. In one embodiment, the fast failure notification message includes a specific destination IP address or MAC address that is dedicated for FFFC. Thus, the fast failure notification message includes information that allows the receiving router(s) to both update their routing and forwarding tables to reflect the network failure and that the fast failure notification should be forward to their next-hop router(s) independently of updating the routing and forwarding tables.

As described above, the fast failure notification message may use the existing IGP PDU packet format or may use a common message format regardless of protocol. Flow then moves to operation 320 and the router floods the fast failure notification message to one or more routers. Flow then moves to operation 325 and the router updates its routing table and forwarding table to reflect the network failure. After the router updates its routing table and forwarding table, the data packets will be re-routed to avoid the network failure.

The operation 325 may, in some embodiments, be started concurrently with the operation 315 and/or 320, however it should be understood that the updating is typically not completed until after the fast failure notification message is generated and transmitted. It should also be understood that the router does not wait until it is finished updating the routing table and forwarding table before generating and transmitting the fast failure notification message. Thus, generating and transmitting the fast failure notification message is performed independently of the updating of the routing and forwarding tables.

Figure 4:
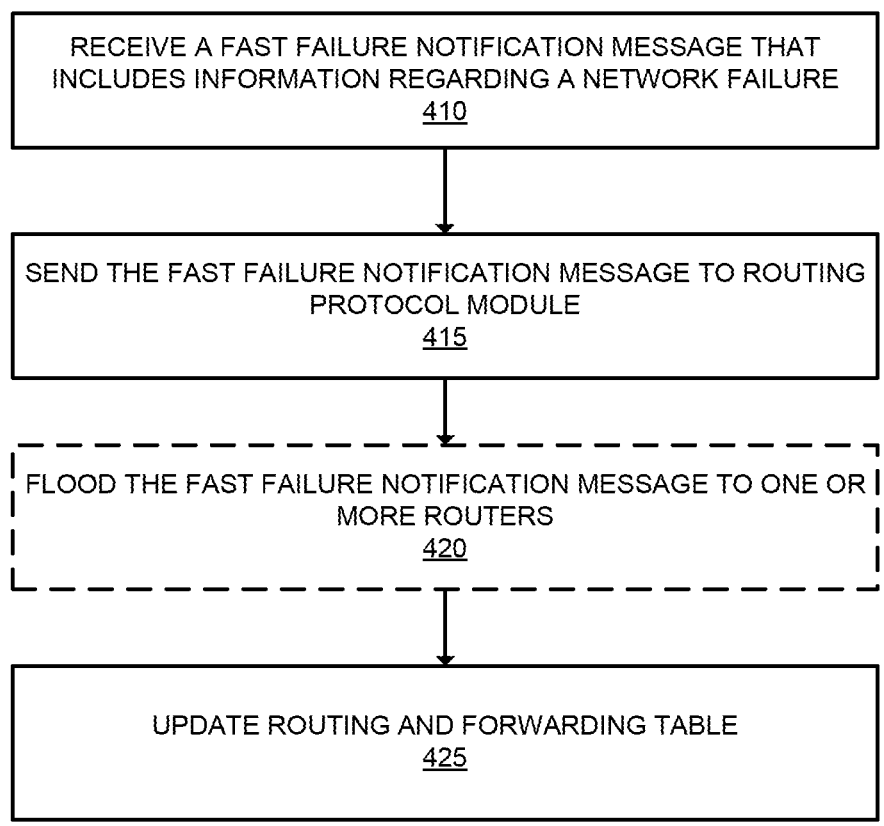
FIG. 4 is a flow diagram that illustrates exemplary operations performed by a router that receives a fast failure notification message according to one embodiment.

FIG. 4 is a flow diagram that illustrates exemplary operations performed by a router that receives a fast failure notification message according to one embodiment. At operation 410, the router receives a fast failure notification message that includes information regarding a network failure. The fast failure notification message also indicates that the message is to be treated in the FFFC architecture. For example, the fast failure notification message may include a specific destination IP address or MAC address that is dedicated for the FFFC described herein. Flow then moves to operation 415.

At operation 415, the fast flooding message is sent to the appropriate routing protocol module on the router (e.g., the IGP module on the router) for further processing. If the router includes next-hop router(s), flow moves to operation 420 and the fast failure notification message is flooded to the next-hop router(s). It should be understood that since this is a fast failure notification message, the router does not wait until it has updated its routing and forwarding table before flooding the fast failure notification message to its next-hop router(s). Flow then moves to operation 425 and the router updates its routing table and forwarding table to reflect the network failure. After the router updates its routing table and forwarding table, the data packets will be re-routed to avoid the network failure.

The operation 425 may, in some embodiments, be started concurrently with the operation 420, however it should be understood that the updating is typically not completed until after the fast failure notification message is flooded. It should also be understood that the router does not wait until it is finished updating the routing table and forwarding table before flooding the fast failure notification message. Thus, flooding the received fast failure notification message to its next-hop router(s) is performed independently of the updating of the routing and forwarding tables.

Bridged Based Fast Failure Notification Message Flooding

In one embodiment, the delivery mechanism for the fast failure notification message flooding is bridged based. A bridged based delivery mechanism for the fast failure notification messages is not subject to tree partition due to link breakages as a tree based delivery mechanism is. All tree based fast flooding schemes have a limitation that, when a router fails or multiple links fail simultaneously (e.g., a line card failure), the flooding becomes partitioned, and routers in a different part of the topology may therefore have a different perception of the topology change. As a result, routing loops and/or black holes may form. The bridged based delivery mechanism described herein is not subject to the flowing becoming partitioned.

Figure 5:
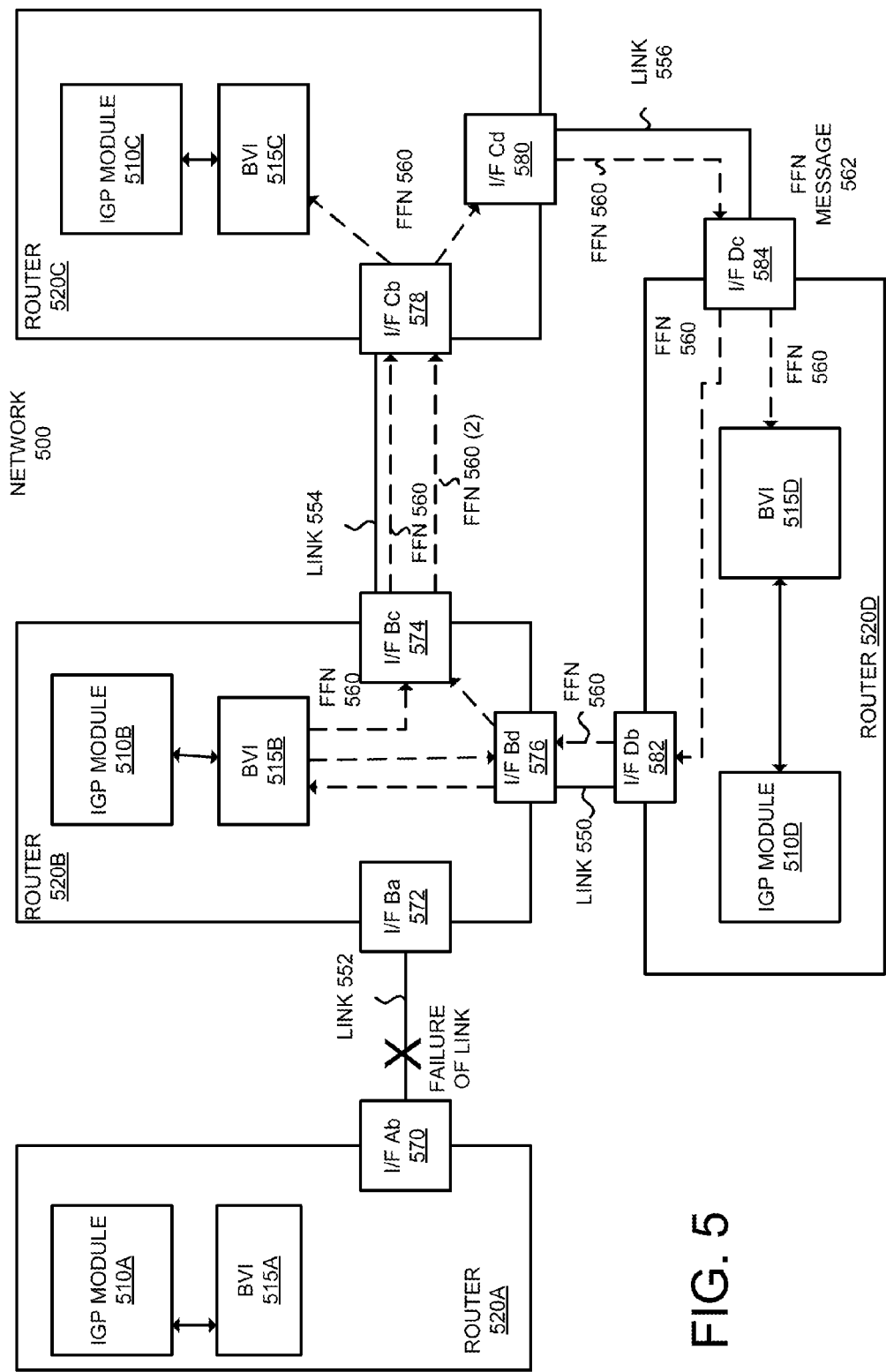
FIG. 5 illustrates an exemplary network that uses bridged based flooding for disseminating fast failure notifications according to one embodiment.

FIG. 5 illustrates an exemplary network 500 that uses bridged based flooding for disseminating fast failure notifications according to one embodiment. The network 500 includes the routers 520A-D, which are all part of a bridged network that includes all nodes and links in an area. The routers 520A-D include the Bridge Virtual Interfaces (BVIs) 515A-D respectively and the IGP modules 510A-D respectively. The BVIs 515A-D are configured to originate and receive fast failure notifications described herein and are part of the data transport layer of the routers 520A-D respectively. The BVIs 515A-D are a type of fast failure notification (FFN) module.

The IGP modules 510A-D are part of the application layer of the routers 520A-D respectively. The router 520A includes the interface Ab 570. The router 520B includes the interfaces Ba 572, Bc 574, Bd 576. The router 520C includes the interfaces Cb 578 and Cd 580. The router 520D includes the interfaces Db 582 and Dc 584. The interfaces Ab 570 and Ba 572 are coupled by the link 552. The interfaces Bc 574 and Cb 578 are coupled by the link 554. The interfaces Cd 580 and Dc 584 are coupled by the link 556. The interfaces Bd 576 and Db 582 are coupled by the link 550.

As illustrated in FIG. 5, the routers form a ring topology. Thus, there is the possibility of looping to occur in the network. MAC move detection is a well known method to protect against loops in a bridged network, however the amount of time for the control plane to populate its decision to all the interfaces on different line cards of the routers (e.g., several milliseconds) may paralyze the network. In one embodiment of the present invention, a learning-once flooding scheme is introduced and used to prevent loops in the network. When a fast forwarding notification message arrives at a bridge interface, the bridge begins its normal MAC learning process. Typically this includes the bridge determining whether the source MAC address of the message is associated with the interface in which the message was received on. The association of MAC addresses and interfaces is typically stored in a bridge MAC table. If an entry does not exist (the MAC address and interface association is new), then the regular MAC learning and flooding process is performed (the fast failure notifications will be flooded to all other interfaces of that bridge group). However, if an entry exists (the MAC address and interface association is already known), then the fast failure notification message is dropped and no further processing is performed.

The learning-once flooding scheme loop prevention mechanism guarantees that each interface will receive a fast failure notification message and flood it to other interfaces at most one time. Thus, a bridge having n interfaces will flood a fast failure notification message at most n times.

In the example illustrated in FIG. 5, the link 552 between the interfaces Ab 570 and Ba 572 has failed. For purposes of explanation, the router 520B detects the failure of the link 552. It should be understood, however, that the router 520A may also detect the failure. The detection of the failure may be performed in different ways in different embodiments. In one embodiment, Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. The detection of the failure of the link 552 is an event in the event framework.

Upon detecting the failure, a fast failure notification message that indicates a failure on the link 552 is sent through the BVI interface 515B to begin the fast flooding process. Specifically, the fast failure notification message 560 is flooded out through the interfaces Bc 574 and 576. The fast failure notification message 560 has a source MAC address assigned to the interface Ba 572. For purposes of this example, the direction of the flooding will be described with respect to the fast failure notification message 560 being flooded out through the interface Bc 574, however it should be understood that similar operations are performed with respect to the fast failure notification message 560 being flooded out through the interface Bc 576.

The fast failure notification message 560 is sent across the link 554 and received at the interface Cb 578 of the router 520C. Assuming that this is the first time that a packet having the source MAC address of the fast failure notification message 560 is received on the interface Cb 578, the interface and MAC address association (e.g., the association of the interface Cb 578 and the MAC address of the interface) is learned (e.g., added to the bridge MAC table). The fast failure notification message 560 is also flooded to the BVI 515C and out through the interface Cd 580. The BVI 515C forwards the notification to the IGP module 510C to process (e.g., update the routing table and/or forwarding table of the router 520C to reflect the failure of the link 552).

The fast failure notification message 560 is sent across the link 556 and received at the interface Dc 584 of the router 520D. In a similar process as described with respect to the router 520C, assuming that this is the first time that a packet having the source MAC address of the fast failure notification message 560 is received on the interface Dc 584, the interface and MAC address association (e.g., the association of the interface Dc 584 and the MAC address of the interface) is learned (e.g., added to the bridge MAC table). The fast failure notification message 560 is also flooded to the BVI 515D and out through the interface Db 582. The BVI 515D forwards the notification to the IGP module 510D to process (e.g., update the routing table and/or forwarding table of the router 520D to reflect the failure of the link 552).

The fast failure notification message 560 is sent across the link 550 and received at the interface Bd 576 of the router 520B. In a similar process as described with respect to the routers 520C and 520D, assuming that this is the first time that a packet having the source MAC address of the fast failure notification message 560 is received on the interface Bd 576 (from an external source), the interface and MAC address association (e.g., the association of the interface Bd 576 and the MAC address of the interface) is learned (e.g., added to the bridge MAC table). The fast failure notification message 560 is also flooded to the BVI 515B and out through the interface Bc 574.

The fast failure notification message 560 is again sent across the link 554 and received on the interface Cb 578. However, since the fast failure notification message 560 has already been received at the interface Cb 578, the fast failure notification message will be dropped and the loop stops.

Figure 6:
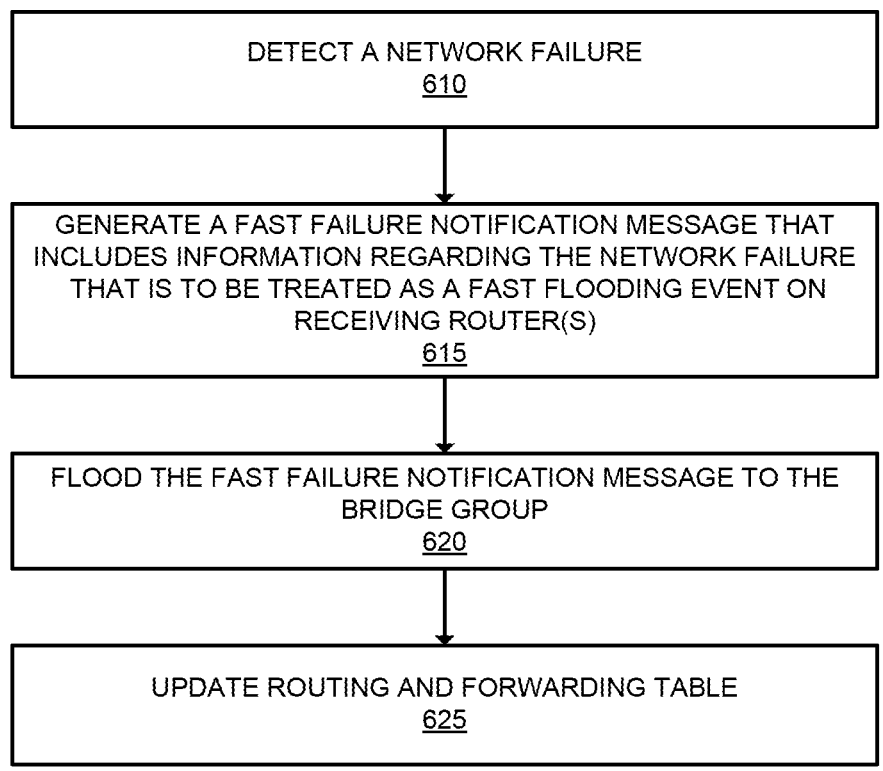
FIG. 6 is a flow diagram that illustrates exemplary operations performed by a router that detects a network failure to initiate the domain-wide FFFC using bridged based fast failure notification message flooding according to one embodiment.

FIG. 6 is a flow diagram that illustrates exemplary operations performed by a router that detects a network failure to initiate the domain-wide FFFC using bridged based fast failure notification message flooding according to one embodiment. At operation 610, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 615.

At operation 615, the router generates a fast failure notification message that includes information regarding the network failure. The fast failure notification message includes a source MAC address of an interface on the router that is connected to the link failure. For example, with reference to FIG. 5, assuming that the link 552 has failed, the router 520B generates a fast failure notification message that includes a source MAC address of the interface Ba 572. The fast failure notification message is to be treated as a fast flooding event on the receiving router(s). For example, the fast failure notification message indicates to the each of the receiving router(s) that it should determine whether to flood the fast failure notification message out one or more of its interfaces in its data transport layer without waiting for convergence (without waiting for the routing and/or forwarding tables to be updated) and update the routing and/or forwarding tables as appropriate to reflect the network failure indicated in the fast failure notification message. Thus, the fast failure notification message indicates to a receiving router that the MAC learning and lookup should be performed by the data transport layer (e.g., the ingress port), without interaction with the application layer (or otherwise the control plane), and thus be performed at line rate, and the application layer is to update the routing and/or forwarding tables as appropriate independently of the flooding process. In one embodiment, the fast failure notification message includes a specific destination MAC address that is dedicated for FFFC to indicate to the receiving routers that it should treat the message as a fast failure notification message. Thus, the fast failure notification message includes information that allows the receiving router(s) to both flood the fast failure notification message at line rate as well as update their routing and/or forwarding tables to reflect the network failure.

Flow then moves to operation 620 and the router floods the fast failure notification message to the bridge group. A bridge group includes one or more network interfaces that are part of the same broadcast domain. For example, with reference to FIG. 5, the router 520B floods the fast failure notification message 560 out through the interfaces Bc 574 and Bd 576. Flow then moves to operation 625 and the router updates its routing table and forwarding table to reflect the network failure. After the router updates its routing table and forwarding table, the data packets will be re-routed to avoid the network failure.

The operation 625 may, in some embodiments, be started concurrently or before the operation 615 and/or 620, however it should be understood that the updating is typically not completed until after the fast failure notification message is generated and transmitted. It should also be understood that the router does not wait until it is finished updating the routing table and forwarding table before generating and transmitting the fast failure notification message. Thus, generating and transmitting the fast failure notification message is performed independently of the updating of the routing and forwarding tables.

Figure 7:
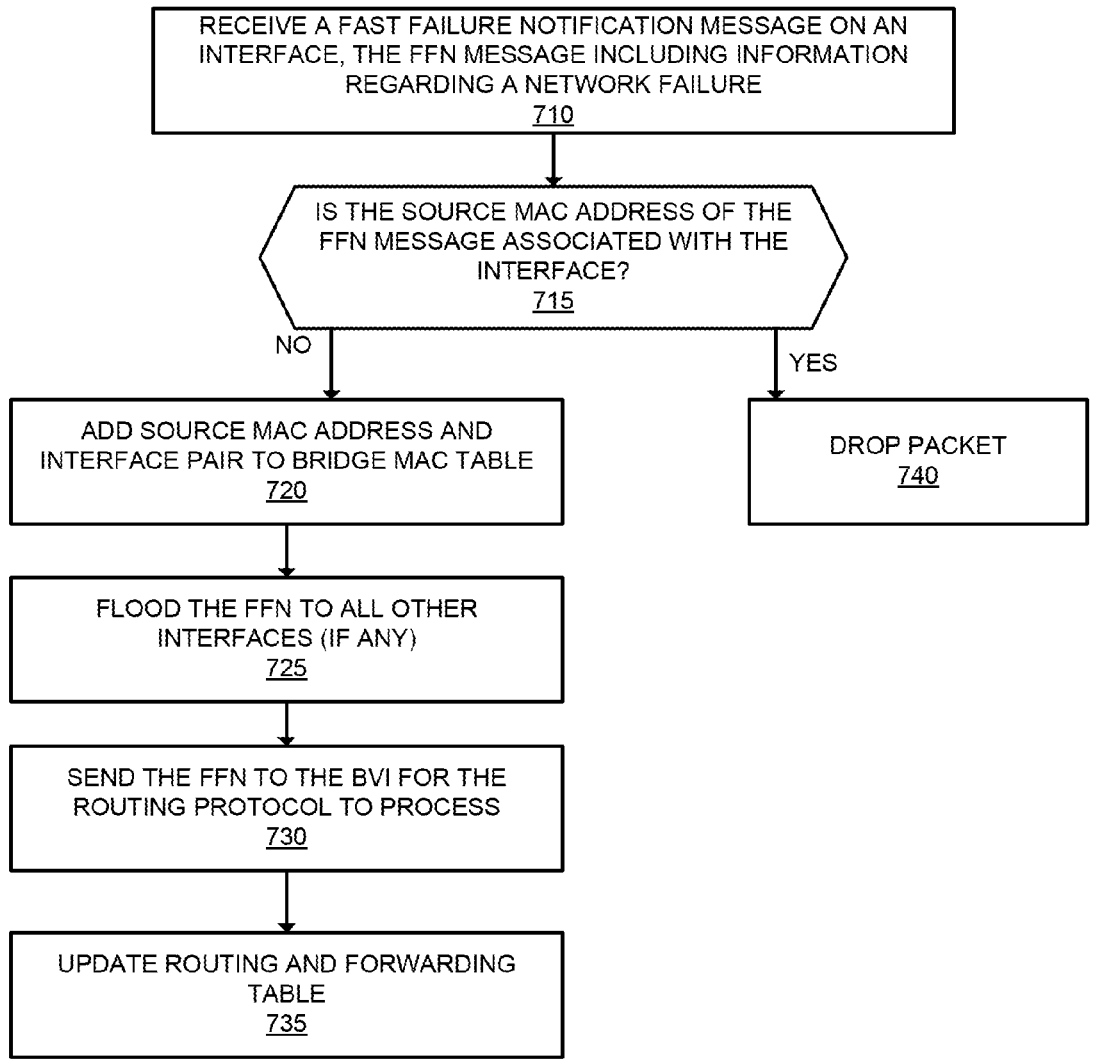
FIG. 7 is a flow diagram that illustrates exemplary operations performed by a router that receives a fast failure notification message in an FFFC architecture that uses bridged based fast failure notification message flooding according to one embodiment.

FIG. 7 is a flow diagram that illustrates exemplary operations performed by a router that receives a fast failure notification message in an FFFC architecture that uses bridged based fast failure notification message flooding according to one embodiment. At operation 710, the router receives on an interface a fast failure notification message that includes information regarding a network failure. The fast failure notification message also indicates that the message is to be treated in the FFFC architecture. For example, the fast failure notification message may include a specific destination IP address or MAC address that is dedicated for the FFFC described herein. Flow then moves to operation 715.

At operation 715, the router determines whether the source MAC address of the fast failure notification message is associated with the interface it was received on. For example, the router accesses a bridge MAC table to determine whether the source MAC address is associated with the interface. If the source MAC address is not associated with the interface, then flow moves to operation 720. If the source MAC address is already associated with the interface (which typically means that the fast failure notification message was already received on that interface), then flow moves to operation 740 and the packet is dropped. As previously described, dropping the packet if it is already known is used to prevent loops in the network. In addition, in one embodiment the MAC learning and lookup is performed within the ingress interface at line rate and is performed without interaction with the control plane of the router. Thus, the learning-once flooding technique of embodiments of the invention is used to prevent loops and is faster (e.g., it operates at line rate) than other commonly used loop prevention techniques such as MAC move detection.

At operation 720, the router associates the source MAC address included in the fast failure notification message with the interface of the router it was received on. For example, the router adds the source MAC address and interface pair to the bridge MAC table. Flow then moves to operation 725 and the router floods the fast failure notification message to all other interfaces of the bridge group, if any, to cause the fast failure notification messages to be sent to neighboring routers. Flow then moves to operation 730 and the fast failure notification message is sent to the BVI for the routing protocol (e.g., the IGP module on the router) for further processing. Flow then moves to operation 735 and the router (e.g., the IGP module) updates the routing table and/or forward table to reflect the failure.

In one embodiment, to restrain the bridge use from non-FFFC purposes, a dedicated MAC address may be reserved and used as the destination MAC address for the fast failure notification messages. In one embodiment, an ACL (access control list) may be configured so that the bridges only accept the dedicated MAC address for FFFC purposes.

STP Based Fast Failure Notification Message Flooding on a Layer 2 Bridged Network In one embodiment, the delivery mechanism for the fast failure notification message flooding is on a layer 2 bridged network uses a spanning tree protocol (STP). Flooding in a layer 2 bridged network is well defined and can be used to deliver the fast failure notification messages. The bridge group is configured on each participating router and STP is enabled on all of the bridges. STP is used to prevent bridge loops by creating a spanning tree of the routers and blocks those interfaces that are not part of the tree. STP is defined in IEEE 802.1D. This type of machine is referred to as a brouter. Upon receiving an IP packet, a brouter routes the IP packet. Upon receiving other types of packets, a brouter bridges the packet. Since a brouter routes IP packets, the fast failure notification message used in the STP based fast failure notification message flooding on a layer 2 bridged network is a layer 2 packet to avoid being forwarded according to the IP forwarding table.

Figure 8:
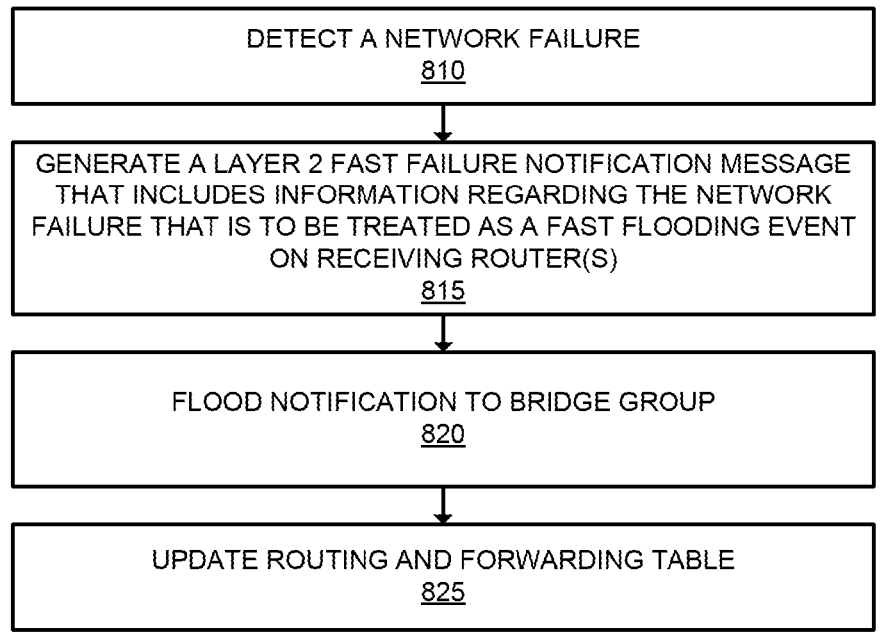
FIG. 8 is a flow diagram that illustrates exemplary operations performed on a router in a layer 2 bridged network that has detected a network failure to initiate the domain-wide FFFC using STP (spanning tree protocol) based flooding according to one embodiment.

FIG. 8 is a flow diagram that illustrates exemplary operations performed on a router (e.g., a brouter) in a layer 2 bridged network that has detected a network failure to initiate the domain-wide FFFC using STP based flooding according to one embodiment. At operation 810, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 815.

At operation 815, the router (e.g., the FFN module on that router) generates a fast failure notification message that includes information regarding the network failure. The fast failure notification message is a layer 2 packet. An exemplary format for a layer 2 fast failure notification message will be described in further detail with reference to FIG. 21. The fast failure notification message is to be treated as a fast flooding event on the receiving router(s). For example, a router that receives the fast failure notification message is to flood the packet to all other interfaces that are not blocked by the STP without waiting for convergence. Thus, the fast failure notification message indicates to a receiving router that its data transport layer should flood the packet to all other ports that are not blocked by the STP without interaction with the application layer and thus performed at line rate, and its application layer is to update the routing and/or forwarding tables as appropriate. Thus, the fast failure notification message includes information that allows the receiving router(s) to both flood the fast failure notification message at line rate as well as update their routing and/or forwarding tables to reflect the network failure.

Flow then moves to operation 820 and the router floods the layer 2 fast failure notification message to the members of the bridge group. Flow then moves to operation 825 and the router updates its routing and/or forwarding table as appropriate to reflect the failure (e.g., the IGP module updates its routing and/or forwarding table as appropriate). The operation 825 may, in some embodiments, be started concurrently or before the operations 815 and/or 820, however it should be understood that the updating is typically not completed until after the fast failure notification message is generated and transmitted. It should also be understood that the router does not wait until it is finished updating the routing table and forwarding table before generating and transmitting the fast failure notification message. Thus, generating and transmitting the fast failure notification message is performed independently of the updating of the routing and forwarding tables.

Figure 9:
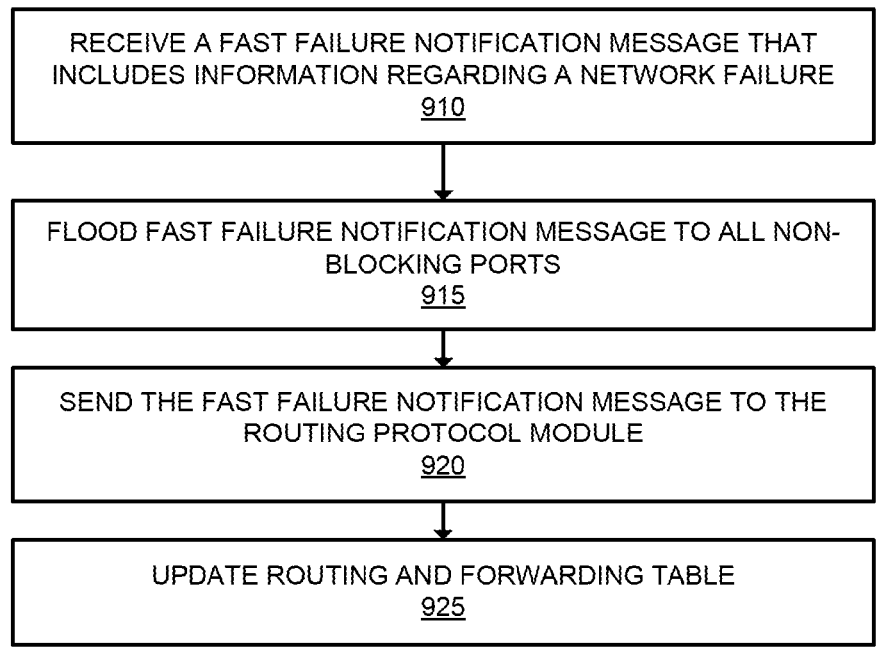
FIG. 9 is a flow diagram that illustrates exemplary operations performed by a router that receives a layer 2 fast failure notification message according to one embodiment.

FIG. 9 is a flow diagram that illustrates exemplary operations performed by a router that receives a layer 2 fast failure notification message according to one embodiment. At operation 910, the router receives a layer 2 fast failure notification message that includes information regarding a network failure. For example, the FFN module (on the data transport layer) of that router receives the layer 2 fast failure notification message. Flow then moves to operation 915 and the router (e.g., the FFN module of that router) floods the fast failure notification message to all other interfaces that are not blocked by the STP. Flow then moves to operation 920 and the fast failure notification message is sent to the routing protocol module (e.g., the IGP module) on the router for further processing. Flow then moves to operation 925 and the routing protocol module updates the routing and forwarding table to reflect the network failure. The operations 920 and 925 may, in some embodiments, be started concurrently or before the operation 915, however it should be understood that the updating is typically not completed until after the fast failure notification message is flooded. It should also be understood that the router does not wait until it is finished updating the routing table and forwarding table before flooding the fast failure notification message.

STP flooding on a layer 2 bridged network is simple and fast. However, STP flooding takes a relatively long duration of time for turnaround (ready for the next hit) and it is also subject to tree partition issues, which implies that it cannot handle simultaneous multiple link failures.

Unicast Based Fast Failure Notification Message Flooding

In one embodiment, the delivery mechanism for the fast failure notification message flooding is unicast based. The router that detects the network failure generates a fast failure notification message and sends a copy to each router in the domain. The identification of the routers in the domain is stored in a routing and/or forwarding table on the router. These unicast fast failure notification messages are forwarded to the destination routers at data plane speed in a similar way that regular IP data traffic is forwarded.

Figure 10:
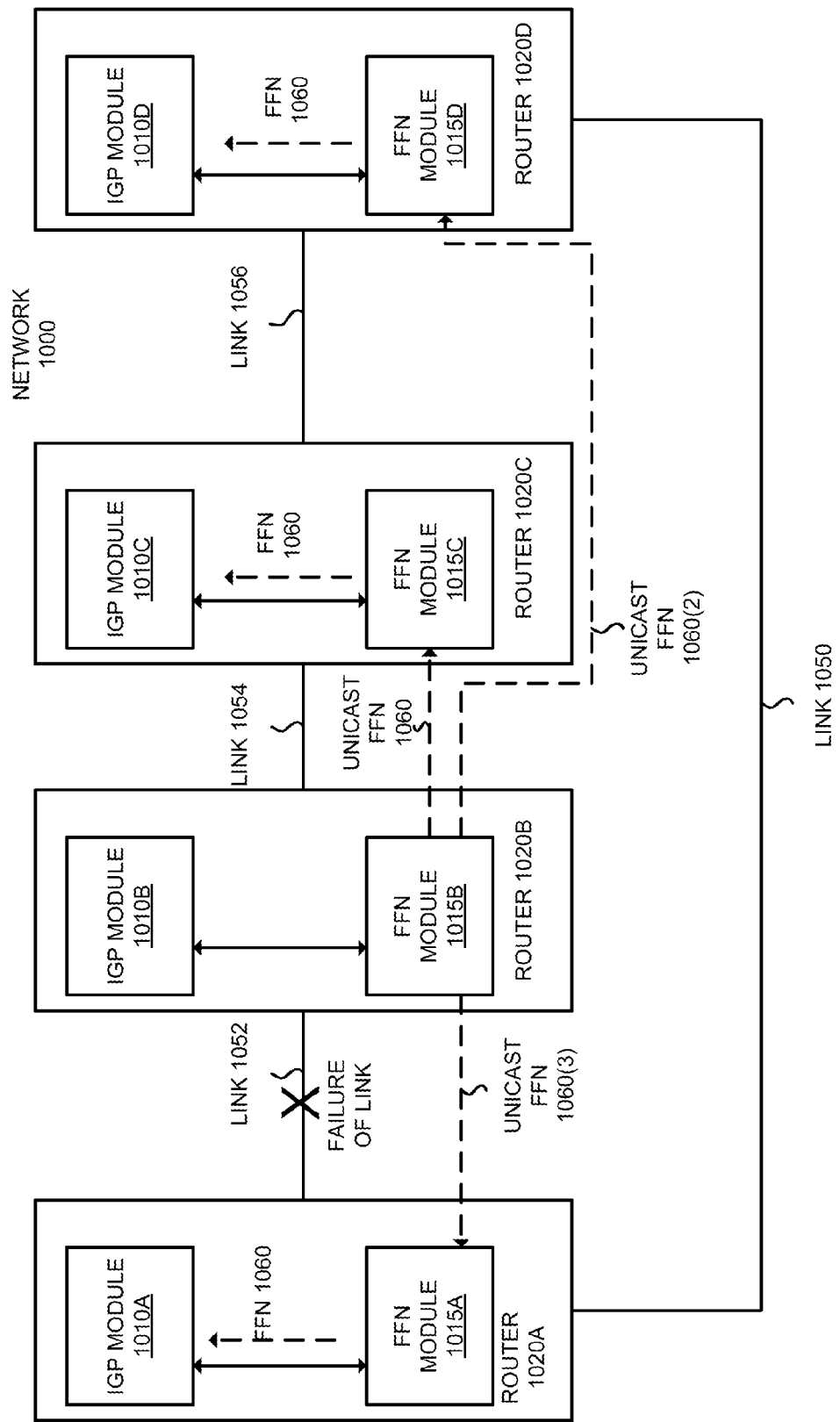
FIG. 10 illustrates an exemplary network that uses unicast based fast failure notification message flooding according to one embodiment.

FIG. 10 illustrates an exemplary network that uses unicast based fast failure notification message flooding according to one embodiment. The network 1000 includes the routers 1020A-D. The routers 1020A and 1020B are coupled by the link 1052. The routers 1020B and 1020C are coupled by the link 1054. The routers 1020C and 1020D are coupled by the link 1056. The routers 1020A and 1020D are coupled by the link 1050. The routers 1020A-D include the IGP modules 1010A-D respectively and the FFN modules 1015A-D respectively. The IGP modules 1010A-D are part of the application layer of the routers 1020A-D respectively and the FFN modules 1015A-D are part of the data transport layer of the routers 1020A-D respectively.

In the example illustrated in FIG. 10, the network 1000 has experienced a network failure. Specifically, the link 1052 has failed. For purposes of explanation, the router 1020B detects the failure of the link 1052. It should be understood, however, that the router 1020A may also detect the failure and perform similar operations as the router 1020B. The detection of the failure may be performed in different ways in different embodiments. In one embodiment, Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. The detection of the failure of the link 1052 is an event in the event framework. Thus, a message is sent to the IGP module 1010B that notifies the IGP module 1010B of the failure of the link 1052 and the IGP module 1010B can update the routing table and forwarding table of the router 1020B to reflect the failure of the link 1052.

Sometime after detecting the failure, the router 1020B originates a fast failure notification message that indicates a failure on the link 252. The fast failure notification message is used to notify other routers that have registered to receive messages of that type of the failure. For example, the fast failure notification message indicates that there is a failure on the link 1052. The router 1020B sends the fast failure notification message to each of the routers in the IP domain. With reference to FIG. 10, the unicast fast failure notification message 1060, which indicates the failure of the link 1052, is sent to the destination IP address of the router 1020C and sent to the destination IP address of the router 1020D. In addition, the unicast fast failure notification message 1060 may also be sent to the destination address of the router 1020A.

Upon a router receiving a fast failure notification message, the router processes the fast failure notification message including updating its routing table and/or forwarding table as appropriate. For example, upon the router 1020C receiving the fast flooding notification message 1060, it will be forwarded to the IGP module 1010C for further processing including updating the routing table and/or forwarding table. In some embodiments, the IGP modules of the receiving routers relaxes its acceptance criteria of the fast failure notification messages by foregoing the adjacency check during packet validation. Domain-wide authentication may be used in order to protect against DoS attacks or PDU replay attacks if the adjacency check is bypassed.

Unlike other fast failure notification message transport techniques described herein, the router that detects the failure is responsible for flooding the fast failure notification messages. Thus, routers that receive the fast failure notification messages do not need to forward or relay the message onto their next hop routers.

Figure 11:
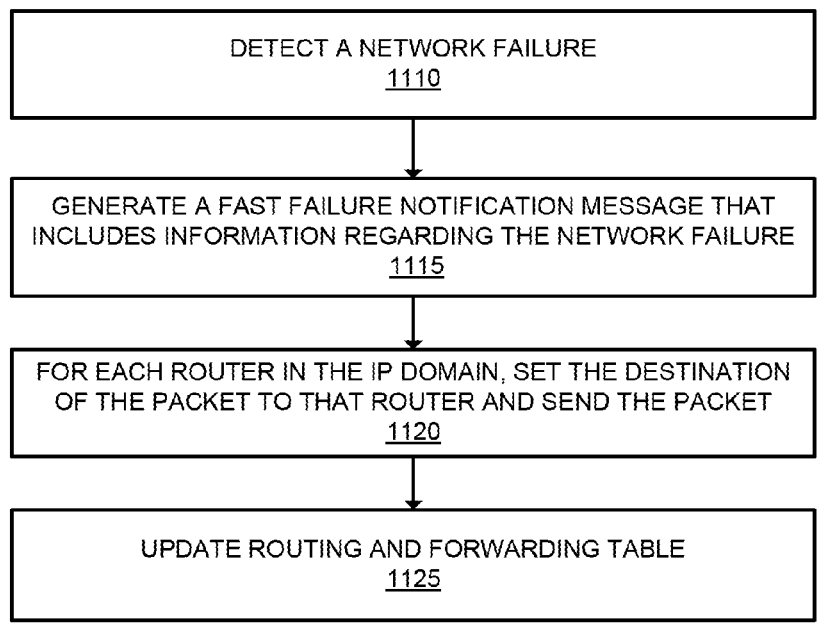
FIG. 11 is a flow diagram that illustrates exemplary operations performed by a router that detects a network failure and uses unicast based fast failure notification message flooding according to one embodiment.

FIG. 11 is a flow diagram that illustrates exemplary operations performed by a router that detects a network failure and uses unicast based fast failure notification message flooding according to one embodiment. At operation 1110, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 1115.

At operation 1115, the router generates a fast failure notification message that includes information regarding the network failure. The fast failure notification message is to be treated as a fast flooding event on the receiving router(s). Thus, the fast failure notification message includes information that allows the receiving router(s) to update their routing and forwarding tables to reflect the network failure. Flow then moves to operation 1120. As described above, the fast failure notification message may use the existing IGP PDU packet format or may use a common message format regardless of protocol.

At operation 1120, a copy of the fast failure notification is sent to each router in the IP domain (e.g., identified in the router's routing and/or forwarding table). For example, for each router in the IP domain, the destination IP address of the packet is set to that router. Flow then moves to operation 1125 and the router updates its routing table and forwarding table to reflect the network failure.

The operation 1125 may, in some embodiments, be started concurrently or before the operations 1115 and/or 1120. In some embodiments, the router does not wait until it is finished updating the routing table and forwarding table before transmitting the fast failure notification message. Thus, generating and transmitting the fast failure notification message is performed independently of the updating of the routing and forwarding tables.

Figure 12:
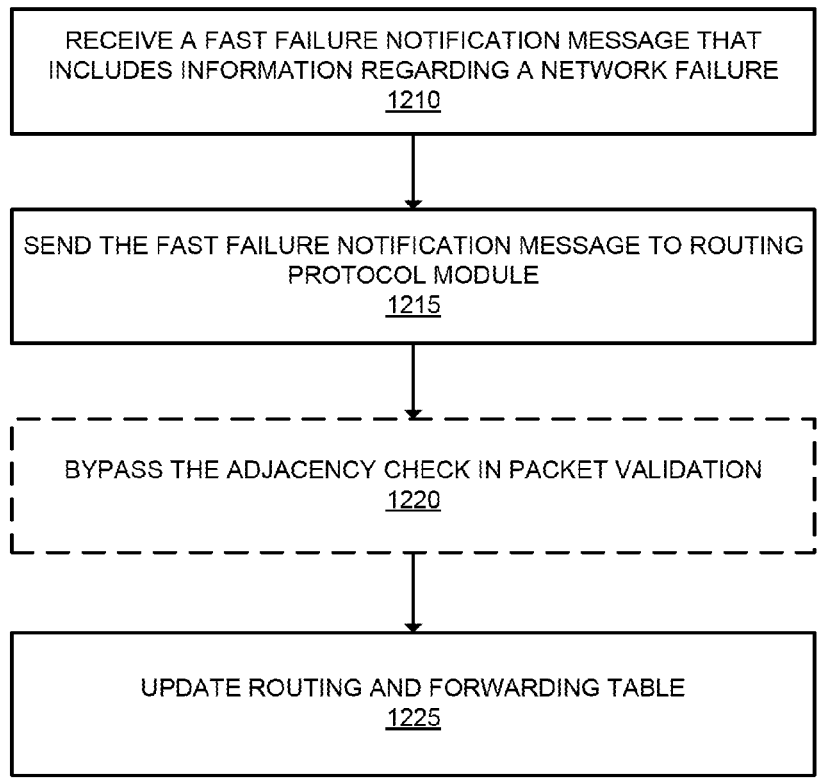
FIG. 12 is a flow diagram that illustrates exemplary operations performed by a router that receives a fast failure notification message transported using unicast based transport technique according to one embodiment.

FIG. 12 is a flow diagram that illustrates exemplary operations performed by a router that receives a fast failure notification message transported using unicast based transport technique according to one embodiment. At operation 1210, the router receives a fast failure notification message that includes information regarding a network failure. Flow then moves to operation 1215. At operation 1215, the fast flooding message is sent to the appropriate routing protocol module on the router (e.g., the IGP module on the router) for further processing. Flow then moves to operation 1220 and the adjacency check that is typically performed by the routing protocol module is bypassed (if the routing protocol module is configured to perform the adjacency check). Flow then moves to operation 1225 and the routing protocol module updates the routing and/or forwarding table to reflect the network failure.

Since the unicast based fast failure notification message flooding technique relies on the router that detects the network failure to generate and transmit fast flooding notifications to the other routers in the IP domain, it may appear that it is too burdensome for the originating router which has to duplicate the packet sending effort multiple times. However, experiments have shown that the burden on the originating router is negligible. For a 100-router network, which is of decent size, the overall time for the originating router to generate and transmit 100 fast flooding notification packets is 7 milliseconds. This small delay on the originating router can be minimized by pre-downloading the fast failure notification message packets to the data plane. Since the data plane already has the list of all routers which are part of the IGP routing table, the data plane can dispatch the packet directly.

In essence, the unicast based fast failure notification message flooding technique is tree based, similar to a multicast tree. However, there is no special tree that is generated for the purpose of the fast failure notification message flooding. Instead, the normal routing table, which is an SPF (shortest path first) tree (SPT) is used. This guarantees that the flooding follow the shortest path (as determined by the routing table) and that no flooding loop is created. In situations where the broken link is on the SPT, the tree is partitioned and the flooding from the originating router will reach only a portion of the tree. However, the entire tree will be notified of the failure because the router on the other end of the link can perform a similar unicast based fast failure notification process to cover the routers on the other part of the tree. For example, with reference to FIG. 10, in addition to the router 1020B generating and transmitting unicast fast failure notification messages to the other routers in the domain responsive to detecting the link failure 1052, the router 1020A can also generate and transmit unicast fast failure notification messages to the other routers in the domain responsive to detecting the link failure 1052.

Gated Multicast Through RPF Check Fast Failure Notification Message Flooding

In one embodiment, the delivery mechanism for the fast failure notification message flooding is multicast based and flooding loops are prevented through an RPF (Reverse Path Forwarding) check. The gated multicast based flooding does not require a multicast tree to be established; rather it uses the same SPT as computed by the IGP module and an RPF check using that SPT before it floods the fast failure notification messages to the other routers. The RPF check determines whether the interface in which the fast failure notification message is received on is also the outgoing interface to reach the source of the fast failure notification message.

In one embodiment, a dedicated multicast address is defined and used for gated multicast based fast failure notification message flooding. This dedicated multicast address is used to identify a fast failure notification message for fast flooding. Upon a router receiving a fast failure notification message at that multicast address, the router performs an RPF check. For example, the router accesses an IP unicast routing table (e.g., the SPT as computed by the IGP module) for the originating router (the router that detected the failure and originated the fast failure notification message) to find the outgoing interface to reach the originating router. When the arriving interface of the fast failure notification message is the same as the outgoing interface to reach the originator router, the RPF check passes and the router floods the notification to other interfaces. If the arriving interface of the fast failure notification message is not the same as the outgoing interface that is used to reach the originating router the originator router, the router drops the packet, thereby preventing a loop.

Figure 13:
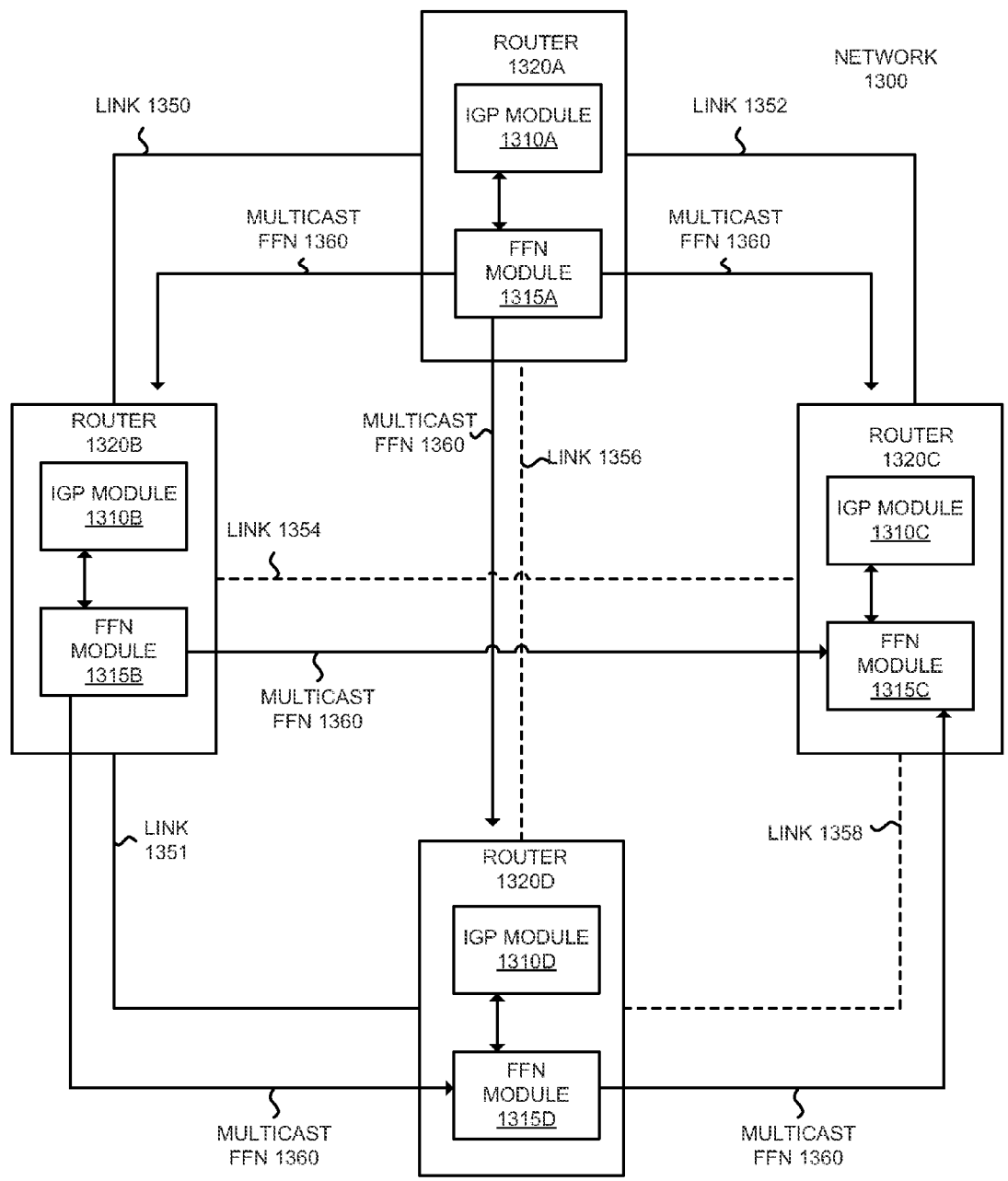
FIG. 13 illustrates an exemplary network that uses gated multicast fast failure notification message flooding according to one embodiment.

FIG. 13 illustrates an exemplary network 1300 that uses gated multicast fast failure notification message flooding according to one embodiment. The exemplary network 1300 includes the routers 1320A-D that include the IGP modules 1310A-D respectively and the FFN modules 1315A-D respectively. The router 1320A is coupled with the router 1320B through the link 1350, is coupled with the router 1320C over the link 1352, and is coupled with the router 1320D over the link 1356. The router 1320B is also coupled with the router 1320C over the link 1354 and the router 1320D over the link 1351. The router 1320C is also coupled with the router 1320D over the link 1358.

The IGP modules 1310A-D of the routers 1320A-D each duplicate their SPT (shortest path tree) (computed by that IGP module) to be used as a bidirectional multicast tree and cause the bidirectional multicast tree to be downloaded to the router's data plane (e.g., install on one or more line cards of the data plane) and add the multicast group address dedicated for the gated multicast based fast failure notification message flooding to join that multicast group.

With reference to FIG. 13, the SPT rooted at the router 1320A includes the link 1350 to reach the router 1320B, the link 1352 to reach the router 1320C, and the links 1350 and 1351 to reach the router 1320D. For example, when the router 1320A sends a packet to the router 1320D, the packet will travel along the link 1350 and the link 1360. The links 1354, 1356, and 1358 are not part of the SPT rooted at the router 1320A.

For purposes of explanation, the router 1320A detects a failure of a link or node, which is not illustrated in order not to obscure understanding of the invention. As described above, the detection of the failure may be performed in different ways in different embodiments. In one embodiment, Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. The detection of the network failure is an event in the event framework.

Sometime after detecting the network failure, the router 1320A generates a fast failure notification message that includes information that identifies the failure. For example, the FFN module 1315A generates the fast failure notification message. The fast failure notification message indicates to the receiving routers that the gated fast flooding process should be performed. For example, the fast failure notification message indicates to a receiving router that its data transport layer should determine whether to multicast the fast failure notification message to its interfaces (and multicast the message if appropriate) independently of its application layer updating the routing table and/or forwarding table to reflect the network failure that is indicated in the fast failure notification message.

The data transport layer identifies a fast failure notification message based on the destination address of the message (the fast failure notification message has a multicast destination address that is dedicated for gated fast failure notification messages). The routers 1320B-D each listen for multicast packets having the dedicated multicast address, and as a result, the routers 1320B-D each receive the multicast fast flooding notification message 1360. Since the routers 1320A-D are arranged in a mesh, there is the possibility that a router can receive multiple copies of the fast failure notification message 1360. For example, the router 1320C may receive the fast failure notification message 1360 from the router 1320A over the link 1352 and may also receive the fast failure notification message 1360 from the router 1320B over the link 1354. To prevent loops, however, an RPF check is performed. For example, the router 1320C will drop the fast failure notification message 1360 from the router 1320A that is received via the router 1320B since the router 1320B is not its RPF nexthop to router 1320A.

Figure 14:
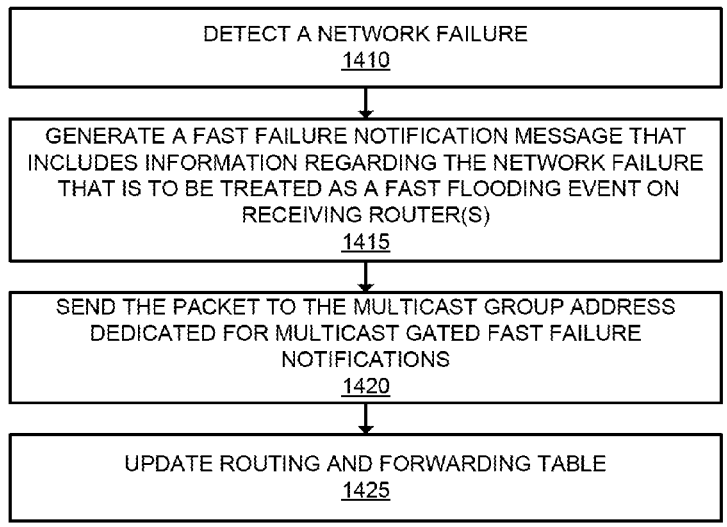
FIG. 14 is a flow diagram that illustrates exemplary operations performed by a router that detects a network failure to initiate the domain-wide FFFC using gated multicast based fast failure notification message flooding according to one embodiment.

FIG. 14 is a flow diagram that illustrates exemplary operations performed by a router that detects a network failure to initiate the domain-wide FFFC using gated multicast based fast failure notification message flooding according to one embodiment. At operation 1410, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 1415.

At operation 1415, the router (e.g., the FFN module on that router) generates a fast failure notification message that includes information regarding the network failure. The fast failure notification message is to be treated as a fast flooding event on the receiving router(s). In addition, the fast failure notification message also indicates to the receiving router(s) that the gated multicast fast flooding process should be performed, which includes performing an RPF check and may include multicasting the fast failure notification to other interfaces. The fast failure notification message has a destination address of the multicast address that is dedicated for multicast gated fast failure notifications. The fast failure notification message is to be forwarded by those router(s) (if any forwarding is to occur) independent of the application layer updating the routing and/or forwarding tables to reflect the change in topology after the network failure. Thus, the fast failure notification message includes information that indicates to the receiving router(s) to both update their routing and/or forwarding tables to reflect the network failure and to perform the gated multicast fast flooding process independently of the updating. Flow then moves to operation 1420 and the router sends the packet to the multicast group address that is dedicated for multicast gated fast failure notifications. Flow then moves to operation 1425 and the router updates its routing and/or forwarding table as appropriate to reflect the failure (e.g., the IGP module updates its routing and/or forwarding table as appropriate).

The operation 1425 may, in some embodiments, be started concurrently or before the operations 1415 and/or 1420, however it should be understood that the updating is typically not completed until after the fast failure notification message is generated and transmitted. It should also be understood that the router does not wait until it is finished updating the routing table and forwarding table before generating and transmitting the fast failure notification message. Thus, generating and transmitting the fast failure notification message is performed independently of the updating of the routing and forwarding tables.

Figure 15:
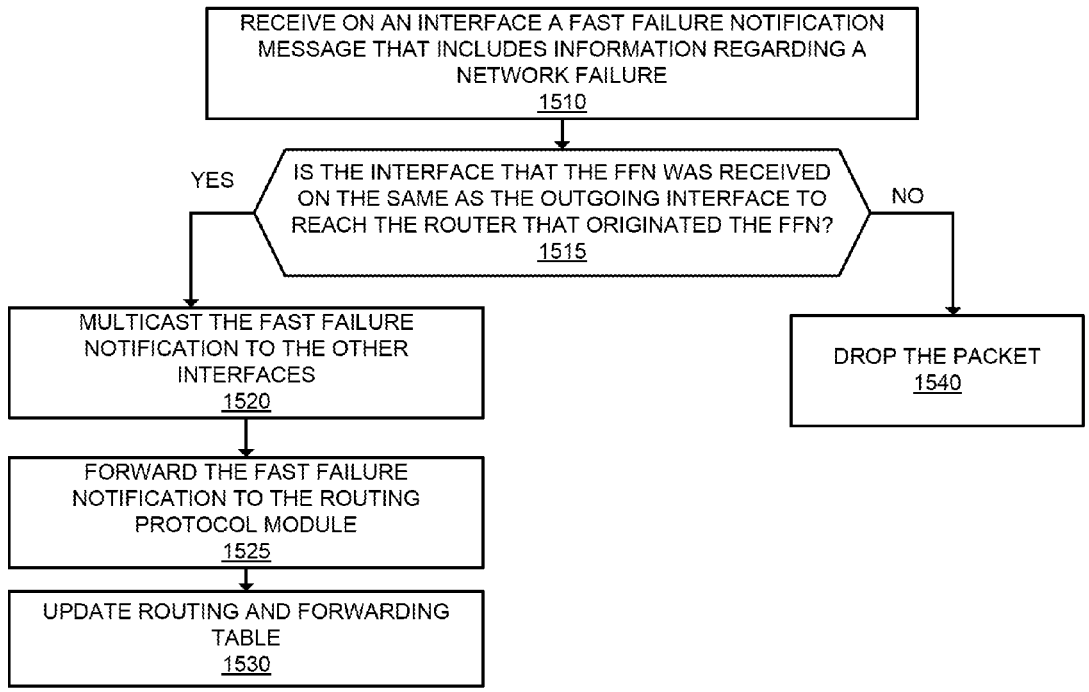
FIG. 15 is a flow diagram that illustrates exemplary operations performed by a router that receives a multicast fast failure notification message in a gated multicast fast failure notification message flooding application according to one embodiment

FIG. 15 is a flow diagram that illustrates exemplary operations performed by a router that receives a multicast fast failure notification message in a gated multicast fast failure notification message flooding application according to one embodiment. At operation 1510, the router receives a multicast fast failure notification message that includes information regarding a network failure. For example, the FFN module of that router receives the multicast fast failure notification message. In addition, the fast failure notification message also indicates to the router that the gated multicast fast flooding process should be performed, which includes performing an RPF check and may include multicasting the fast failure notification to other interfaces. Flow then moves to operation 1515 and the router (e.g., the FFN module) performs an RPF check, which includes determining whether the arriving interface of the fast failure notification message is the same as the outgoing interface to reach the originator router. For example, the router accesses an IP unicast routing table for the router that is the source of the multicast fast failure notification packet to determine the outgoing interface to reach that router. As a specific example, the FFN module of the receiving router uses the bidirectional multicast tree on the data plane that was generated based off the SPT to determine the outgoing interface to reach the source of the multicast fast failure notification packet. If the incoming interface of the fast failure notification message is the same as the outgoing interface to reach the router that originated the fast failure notification message, then flow moves to operation 1520; otherwise flow moves to operation 1540 and the packet is dropped.

At operation 1520, the router (e.g., the FFN module of that router) multicasts the fast failure notification to the other interfaces of the router. For example, with reference to FIG. 13, responsive to the router 1320B receiving the multicast fast failure notification message 1360 on the link 1350 and determining that the interface corresponding to the link 1350 is the same interface that is used to reach the router 1320A, the FFN module 1315B multicasts the fast failure notification message 1360 out on the interfaces corresponding to the links 1354 and 1360. Flow moves from operation 1520 to operation 1525 and the FFN module forwards the fast failure notification to the routing protocol module (e.g., the IGP module) on the router. Flow then moves to operation 1530 and the routing protocol module updates the routing and forwarding table to reflect the network failure.

The operation 1530 may, in some embodiments, be started concurrently or before the operation 1520, however it should be understood that the updating is typically not completed until after the fast failure notification message is flooded. It should also be understood that the router does not wait until it is finished updating the routing table and forwarding table before flooding the fast failure notification message.

Shortest Path Tree (SPT) Elect Root Fast Failure Notification Message Flooding

In one embodiment, the delivery mechanism for the fast failure notification messages is multicast based that uses an SPT that is based on an SPF (shortest path first) calculation that elects one of the routers as a root node. The tree is similar to a bidirectional multicast tree, but it is directly built by the IGP process. The routers in the network elect one of the routers to be the root node and the IGP modules construct an SPT rooted at the elected router based on the current network topology. In one embodiment, the routers elect the router with the highest router-id to be the root node. Bidirectional multicast forwarding entries can be created by the IGP module (e.g., IS-IS or OSPF) based off the constructed SPT and then downloaded to the data plane (e.g., to one or more line cards of the routers) for use in disseminating the fast failure notification messages. The fast failure notification messages are forwarded using the normal multicast protocol using the downloaded bidirectional multicast forwarding entries.

Figure 16:
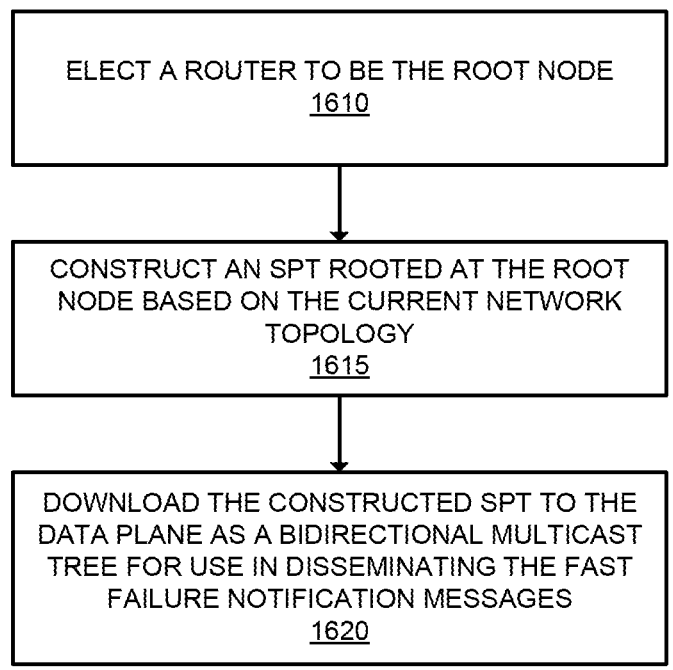
FIG. 16 illustrates exemplary operations for building an SPT (Shortest Path Tree) based on SPF (Shortest Path First) calculation performed at a router according to one embodiment.

FIG. 16 illustrates exemplary operations for building an SPT based on SPF calculation performed at a router according to one embodiment. At operation 1610, the router elects a router of the network to be a root node. The elected router is not necessarily the router that is performing the operation 1610. In one embodiment, the router that is elected the root node has the highest router-id. Of course, the election of the root node may be performed differently in different embodiments (e.g., the router with the lowest router-id), but in any case, the routers in the network need to agree on which router is the root node. Flow then moves to operation 1615 and the router constructs an SPT rooted at the elected root node based on the current network topology. For example, the router executes an SPF implementation on the LSDB (link state database) (e.g., if using OSPF or IS-IS) of the router. Flow then moves to operation 1620 and the constructed SPT is downloaded to the data plane of the router (e.g., to the data transport layer of the router) as a bidirectional multicast tree for use in disseminating the fast failure notification messages.

Figure 17:
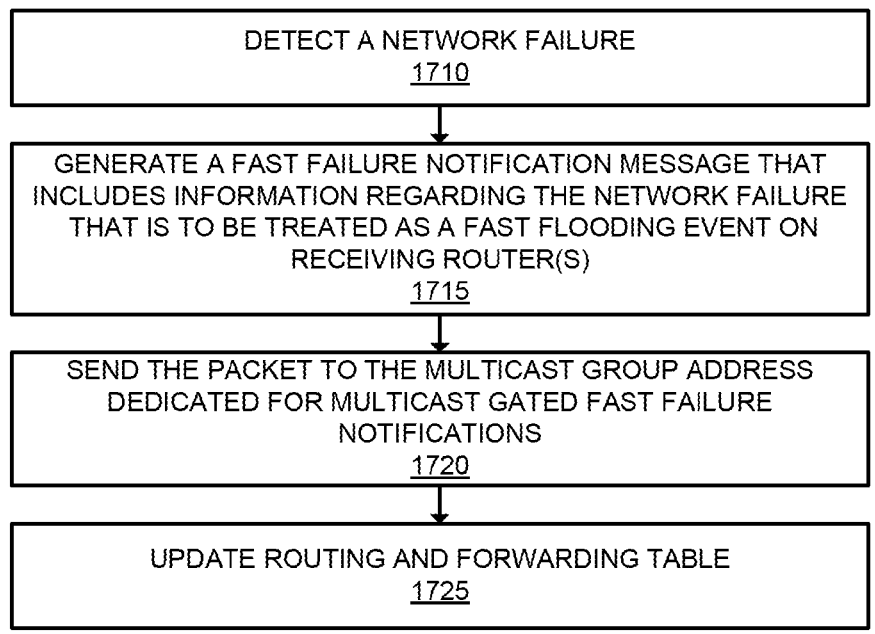
FIG. 17 illustrates exemplary operations performed by a router that detects a network failure to initiate the domain-wide FFFC using multicast based fast failure notification message using an SPT that is based on an SPF elect root node calculation according to one embodiment.

FIG. 17 illustrates exemplary operations performed by a router that detects a network failure to initiate the domain-wide FFFC using multicast based fast failure notification message using an SPT that is based on an SPF elect root node calculation according to one embodiment. At operation 1710, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 1715.

At operation 1715, the router (e.g., the FFN module on that router) generates a fast failure notification message that includes information regarding the network failure. The fast failure notification message is to be treated as a fast flooding event on the receiving router(s). The fast failure notification message indicates to the receiving router(s) that the multicast fast flooding process should be performed using the SPT that is based on the SPT elect root node calculation, which may include multicasting the fast failure notification. In one embodiment, the fast failure notification message has a destination address of the multicast address that is dedicated for multicast fast failure notifications. The multicast decision and any resulting multicasting of the fast failure notification message by those router(s) occurs independent of the application layer updating the routing and/or forwarding tables. Thus, the fast failure notification message indicates to the receiving router(s) to both multicast the fast failure notification message at line rate and update their routing and/or forwarding tables to reflect the network failure.

Flow moves from operation 1715 to operation 1720 and the router sends the packet to the multicast group address that is dedicated for the multicast fast failure notifications. Flow then moves to operation 1725 and the router updates its routing and/or forwarding table as appropriate to reflect the failure (e.g., the IGP module updates its routing and/or forwarding table as appropriate).

The operation 1725 may, in some embodiments, be started concurrently or before the operations 1715 and/or 1720, however it should be understood that the updating is typically not completed until after the fast failure notification message is generated and transmitted. It should also be understood that the router does not wait until it is finished updating the routing table and forwarding table before generating and transmitting the fast failure notification message. Thus, generating and transmitting the fast failure notification message is performed independently of the updating of the routing and forwarding tables.

Figure 18:
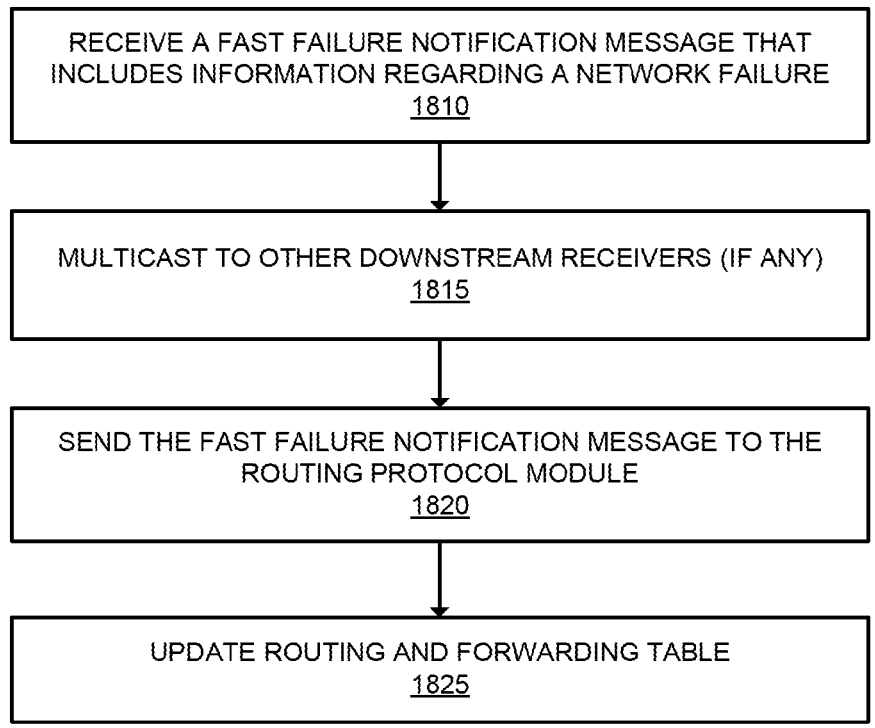
FIG. 18 is a flow diagram that illustrates exemplary operations performed by a router that receives a multicast fast failure notification message in an SPT elect root node based FFFC application according to one embodiment.

FIG. 18 is a flow diagram that illustrates exemplary operations performed by a router that receives a multicast fast failure notification message in an SPT elect root node based FFFC application according to one embodiment. At operation 1810, the router receives a multicast fast failure notification message that includes information regarding a network failure. For example, the FFN module of that router receives the multicast fast failure notification message. The fast failure notification message indicates to the router that the SPT elect root node based multicast fast flooding process should be performed, which may include multicasting the fast failure notification to other interfaces (as indicated by the bidirectional multicast tree based on the SPT elect root process described above). Flow moves from operation 1810 to operation 1815.

At operation 1815, the router (e.g., the FFN module of the router) multicasts the fast failure notification message to other routers as indicated by the bidirectional multicast tree in its data plane (generated based on the SPT elect root process described above). It should be understood that if there is not a multicast receiver (e.g., another router) downstream from the router as indicated in the bidirectional multicast tree, the router does not multicast the packet. In one embodiment, a loop prevention process (e.g., RPF check) may also be performed. Flow moves from operation 1815 to operation 1820 and the fast failure notification message is sent to the routing protocol module. For example, the FFN module of the router forwards the fast failure notification to the IGP module on the router for further processing. Flow then moves to operation 1825 and the routing protocol module updates the routing and/or forwarding table as appropriate to reflect the network failure. The operations 1820 and/or 1825 may, in some embodiments, be started concurrently or before the operation 1815, however it should be understood that the updating is typically not completed until after the fast failure notification message multicast (if the message is to be multicast). It should also be understood that the router does not wait until it is finished updating the routing table and forwarding table before multicasting the fast failure notification message.

PIM Bidirectional Multicast Distribution Tree Fast Failure Notification Message Flooding In one embodiment, the delivery mechanism for the fast failure notification messages uses a bidirectional multicast distribution tree built using the PIM (Protocol Independent Multicast) protocol. The bidirectional multicast distribution tree that is built is dedicated for fast failure notification messages. In a specific embodiment, the bidirectional PIM (BIDIR-PIM) protocol is used to establish the bidirectional multicast tree for the fast flooding of the fast failure notification messages. However, in other embodiments, other variants of the PIM protocol (e.g., PIM-ASM (Any-Source Multicast), PIM-SSM (Source-Specific Multicast)) are used to build the multicast tree(s) for the fast flooding of the fast failure notification messages.

In one embodiment, a dedicated multicast address is defined and used for the fast failure notification message flooding. This dedicated multicast address is used to identify a fast failure notification message for fast flooding. Each participating router in the network includes a BIDIR-PIM protocol implementation and configures and runs the BIDIR-PIM protocol to generate a bidirectional multicast tree and cause that multicast tree to be downloaded to the router's data plane (e.g., installed on one or more line cards). The BIDIR-PIM protocol uses information derived from the routing protocol (e.g., the IGP module) when building the bidirectional multicast tree. The bidirectional multicast tree is used in disseminating the fast failure notification messages. In addition, each router adds the dedicated multicast address to join the multicast group. The fast failure notification messages are forwarded using the normal multicast protocol using the downloaded bidirectional multicast tree.

Figure 19:
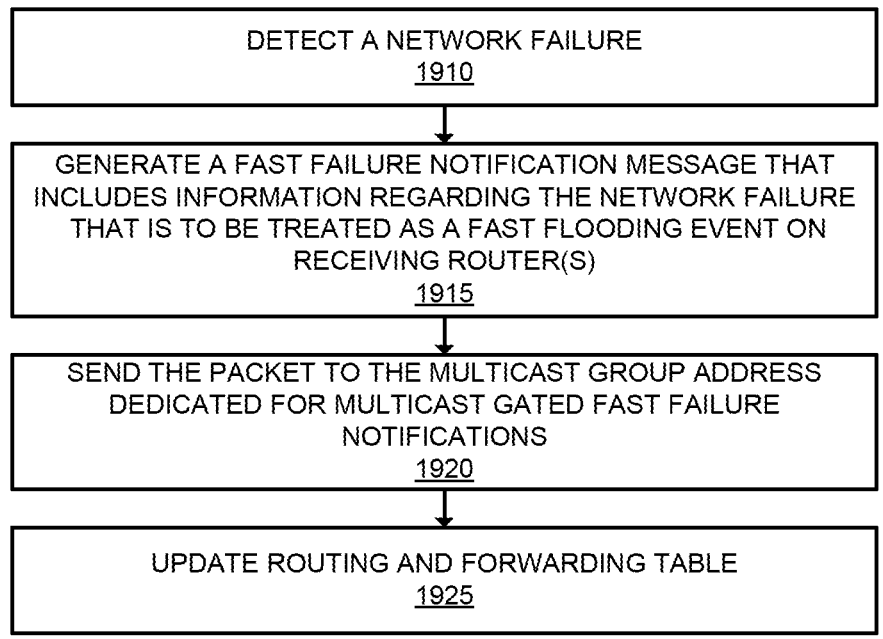
FIG. 19 illustrates exemplary operations performed by a router that detects a network failure to initiate the domain-wide FFFC using multicast fast failure notification message using a bidirectional multicast tree built using the PIM (Protocol Independent Multicast) protocol according to one embodiment.

FIG. 19 illustrates exemplary operations performed by a router that detects a network failure to initiate the domain-wide FFFC using multicast fast failure notification message using a bidirectional multicast tree built using the PIM protocol according to one embodiment. At operation 1910, the router detects a network failure. In one embodiment Layer-2 link-event monitoring and signaling is used to detect the failure. In another embodiment, Bidirectional Forwarding Detection (BFD) is used to detect the failure. In another embodiment, a combination of Layer-2 link event monitoring and signaling and BFD is used to detect the failure. Flow then moves to operation 1715.

At operation 1915, the router (e.g., the FFN module on that router) generates a fast failure notification message that includes information regarding the network failure. The fast failure notification message is to be treated as a fast flooding event on the receiving router(s). The fast failure notification message indicates to the receiving router(s) that the multicast fast flooding process should be performed using the bidirectional multicast tree built using the PIM protocol, which may include multicasting the fast failure notification. In one embodiment, the fast failure notification message has a destination address of the multicast address that is dedicated for multicast fast failure notifications. The fast failure notification message is to be forwarded by those router(s) (if any forwarding is to occur) independent of the application layer updating the routing and/or forwarding tables to reflect the network failure. Thus, the fast failure notification message indicates to the receiving router(s) to both multicast the fast failure notification message at line rate and update their routing and/or forwarding tables to reflect the network failure.

Flow moves from operation 1915 to operation 1920 and the router sends the packet to the multicast group address that is dedicated for the multicast fast failure notifications. Flow then moves to operation 1925 and the router updates its routing and/or forwarding table as appropriate to reflect the failure (e.g., the IGP module updates its routing and/or forwarding table as appropriate).

The operation 1925 may, in some embodiments, be started concurrently or before the operations 1915 and/or 1920, however it should be understood that the updating is typically not completed until after the fast failure notification message is generated and transmitted. It should also be understood that the router does not wait until it is finished updating the routing table and forwarding table before generating and transmitting the fast failure notification message. Thus, generating and transmitting the fast failure notification message is performed independently of the updating of the routing and forwarding tables.

Figure 20:
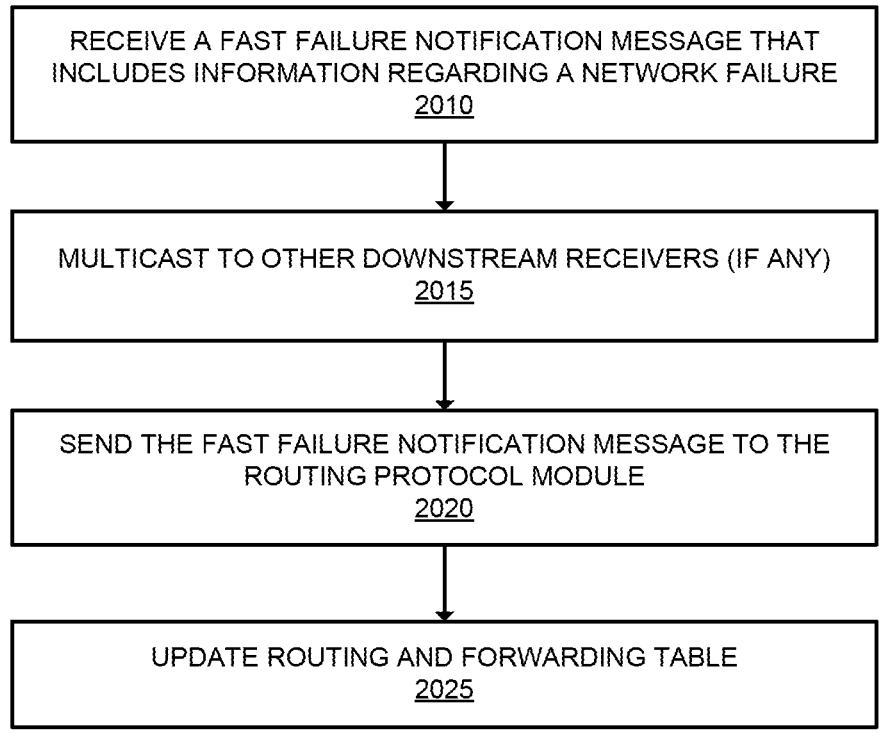
FIG. 20 is a flow diagram that illustrates exemplary operations performed by a router that receives a multicast fast failure notification message in a FFFC application that uses a bidirectional multicast tree that is built using the PIM protocol according to one embodiment.

FIG. 20 is a flow diagram that illustrates exemplary operations performed by a router that receives a multicast fast failure notification message in a FFFC application that uses a bidirectional multicast tree that is built using the PIM protocol according to one embodiment. At operation 2010, the router receives a multicast fast failure notification message that includes information regarding a network failure. For example, the FFN module of that router receives the multicast fast failure notification message. In addition, the fast failure notification message also indicates to the router that the multicast fast flooding process should be performed, which may include multicast the fast failure notification to other interfaces (as indicated by the bidirectional multicast tree based built using the PIM protocol). Flow moves from operation 2010 to operation 2015.

At operation 2015, the router (e.g., the FFN module of the router) multicasts the fast failure notification message to other routers as indicated by the bidirectional multicast tree in its data plane (generated by the PIM protocol). It should be understood that if there is not a multicast receiver (e.g., another router) downstream from the router as indicated in the bidirectional multicast tree, the router does not multicast the packet. In one embodiment, a loop prevention process (e.g., RPF check) may also be performed. Flow moves from operation 2015 to operation 2020 and the fast failure notification message is sent to the routing protocol module. For example, the FFN module of the router forwards the fast failure notification to the IGP module on the router for further processing. Flow then moves to operation 2025 and the routing protocol module updates the routing and/or forwarding table as appropriate to reflect the network failure. The operations 2020 and/or 2025 may, in some embodiments, be started concurrently or before the operation 2015, however it should be understood that the updating is typically not completed until after the fast failure notification message multicast (if the message is to be multicast). It should also be understood that the router does not wait until it is finished updating the routing table and forwarding table before multicasting the fast failure notification message.

A PIM based solution for flooding the fast failure notification messages has the advantage that many routers currently have the capability of running PIM so the amount of additional code that needs to be written is fairly minimal. In addition, compared to bridged based flooding techniques for disseminating the fast failure notification messages (which are layer 2 mechanisms), the PIM based solution uses layer 3 mechanisms and may be considered easier for layer 3 routing/forwarding applications. However, a PIM based solution does increase the overhead in router configurations and signaling in order to maintain the tree states in the network. In addition, a PIM based solution is more complex than bridging and may be less robust in terms of network failure handling.

Fast Failure Notification Message Format

In one embodiment, the fast failure notification messages described herein use a message format that is independent of IGP and is a layer 2 protocol packet and issued by the data transport layer. As previously described, the message format for the fast failure notification messages may use the existing IGP PDU packet format. For example, if the IGP is OSPF, the OSPF Router-LSA (link state advertisement), which reflects a broken adjacency (one few router link) can be used as the fast failure notification message and fast-flooded to the routers without special modification. Using an existing IGP PDU packet format has the advantages that the format already exists (no additional data format is needed) and naturally integrates into the slow flooding when the same LSA arrives. However, using the existing IGP PDU packet format has the disadvantages that it is different per IGP protocol (e.g., the existing IGP PDU packet format for OSPF is different than that of IS-IS), and the message format is originated by the IGP module, which is typically in the control plane, or otherwise requires pre-computation and still requires the data plane's (transport layer) dispatching mechanism.

The independent message format described herein has the advantages that it is independent of IGP (thus the same message format may be used for different IGP implementations), is issued by the data plane (the data transport layer), and is closer to the triggering point resulting in a shorter per event path.

The independent message format is TLV based. The TLV may or may not be packed in an IP packet, depending on the requirement of the underlying fast flooding transport. FIG. 21 illustrates an exemplary independent message format for fast failure notification messages according to one embodiment. The exemplary fast failure notification message format 2110 includes the type field 2115, which indicates that the message is a fast failure notification message, the length field 2120, and the value variable fields, namely the advertising router ID field 2125, the advertising link ID field 2130, the peer router ID field 2135, and the peer link ID field 2140. These fields identify the router and link that originates the fast failure notification message and the router and link that is experiencing the failure. The TLV based independent message format allows for future development and extension.

The independent message format allows the handling of a fast failure notification message to be independent of IGP processing. Upon receiving a fast failure notification message using the IGP independent format, the router treats the message as a local event in the event framework described herein. In one embodiment, timeout machinery is used to protect against cases where the fast failure notification message using the independent message format is mistakenly flooded due to a bug or other error condition, or by a denial of service attack. Upon expiration of the timer, the router will rollback the system to ensure that the error is short-lived and self recoverable.

In one embodiment, the independent message for the fast failure notification message does not replace the regular notification message. Thus, the protocol independent fast failure notification message is first forwarded through the FFFC architecture described herein and the regular IGP flooding that reflects the network failure follows.

After receiving a fast failure notification using the protocol independent message format, the message will be sent to the IGP module for processing. For example, the IGP module will update its routing topology database accordingly (e.g., its LSDB), cancel the safety timer (if implemented), and run a shortest path first (SPF) process on the updated database to determine whether to update the routing and/or forwarding tables accordingly. The router may also disseminate the fast failure notification depending on the transport used.

As described herein, the FFFC architecture detaches the forwarding of the network failure notification message from the application layer and moves it onto the data transport layer. As a result, control plane and data plane interaction is not required to forward the network failure notification message which reduces the time necessary for network-wide convergence, which minimizes the network down time in the event of a network failure.

As described herein, operations may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., router (s)). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a router for participating in fast flooding based fast convergence to recover from a network failure, the method comprising the steps of:
   receiving, on an interface of the router, a first fast failure notification message that includes information that identifies a network failure;
   responsive to determining that a source MAC (Media Access Control) address of the fast failure notification message is not associated with the interface, performing the following steps:
      adding the source MAC address and interface pair to a bridge MAC table of the router,
      flooding the first fast failure notification message to one or more other interfaces of the router for transport to one or more other routers, and
      updating a routing table to reflect the network failure;
   wherein the step of flooding the first fast failure notification message is performed prior to completion of the step of updating the routing table to reflect the network failure.

2. The method of claim 1, further comprising the steps of:
   receiving, on the interface of the router, a second fast failure notification message that includes information that identifies a network failure;
   responsive to determining that a source MAC address of the second fast failure notification message is associated with the interface, dropping the packet.

3. The method of claim 1, wherein the first fast failure notification message has a format that is protocol independent.

4. The method of claim 1, wherein the first fast failure notification message has an IGP PDU (Interior Gateway Protocol Protocol Data Unit) packet format that is specific to a particular IGP routing protocol.

5. The method of claim 2, wherein the first and second fast failure notification messages are identified through identification of a specific destination MAC address reserved for fast flooding based fast convergence.

6. A router to participate in fast flooding based fast convergence to recover from a network failure, the router comprising:
   an application layer entity including a routing protocol module configured to manage a routing table; and
   a data transport layer entity including:
      a plurality of interfaces to couple the router with a plurality of other routers,
      a bridge MAC (Media Access Control) table to store associations of MAC addresses and interfaces, and
      a Fast Failure Notification (FFN) module that is configured to, in response to receipt at one of the plurality of interfaces a first fast failure notification message that includes information that identifies a network failure, perform the following:
         responsive to a determination that a source MAC (Media Access Control) address of the first fast failure notification message is associated with the interface in which the first fast failure notification message was received on, associate the source MAC address and interface to the bridge MAC table, flood the first fast failure notification message to one or more other ones of the plurality of interfaces of the router, and send the first fast failure notification message to the routing protocol module to update the routing table to reflect the network failure,
      wherein the FFN module is to flood the first fast failure notification message to the one or more other ones of the plurality of interfaces prior to the routing protocol module completing its update of the routing table to reflect the network failure.

7. The router of claim 6, wherein the FFN module is further configured to, in response to receipt at one of the plurality of interfaces a second fast failure notification message that includes information that identifies a network failure, perform the following:
responsive to determining that a source MAC address of the second fast failure notification message is associated with the interface in which the second fast failure notification message was received on, drop the packet.

8. The router of claim 6, wherein the first fast failure notification message has a format that is protocol independent.

9. The router of claim 6, wherein the routing protocol module is an IGP (Interior Gateway Protocol) module, and wherein the first fast failure notification message has an IGP PDU (Protocol Data Unit) packet format that is specific to the IGP module.

10. The router of claim 7, wherein the first and second fast failure notification messages are identified through identification of a specific destination MAC address reserved for fast flooding based fast convergence.

11. A method in a router for participating in fast flooding based fast convergence to recover from a network failure, wherein the router is one of a plurality of routers in a network, the method comprising the steps of:
electing one of the plurality of routers in the network to be a root node;
constructing a shortest path first tree rooted at the root node based on current network topology;
joining a multicast group;
receiving, on an interface of the router, a fast failure notification message that includes information that identifies a network failure, wherein the first fast failure notification message is addressed to an address associated with the multicast group;
multicasting the fast failure notification message according to the shortest path first tree, wherein the fast failure notification message is multicasted to one or more interfaces on the shortest path first tree excluding the receiving interface;
updating a routing table of the router to reflect the network failure;
wherein the step of multicasting the fast failure notification message according to the shortest path first tree is performed prior to completion of the step of updating the routing table to reflect the network failure.

12. The method of claim 11, further comprising the steps of:
downloading the shortest path first tree to a data transport layer of the router;
wherein the step of multicasting the first failure notification message according to the shortest path first tree is performed at the data transport layer without interaction from an application layer of the router.

13. The method of claim 11, wherein the address associated with the multicast group is reserved for fast failure notification messages.

14. The method of claim 11, wherein the fast failure notification message has a format that is protocol independent.

15. The method of claim 11, wherein the fast failure notification message has an IGP PDU (Interior Gateway Protocol Protocol Data Unit) packet format that is specific to a particular IGP routing protocol.

16. The method of claim 12, wherein the step of updating the routing table is performed by the application layer of the router.

17. A router to participate in fast flooding based fast convergence to recover from a network failure, the router comprising:
an application layer entity including a routing protocol module configured to manage a routing table; and
a data transport layer entity including:
a plurality of interfaces to couple the router with a plurality of other routers,
a shortest path first tree rooted at one of the plurality of routers,
a Fast Failure Notification (FFN) module that is configured to, in response to receipt at one of the plurality of interfaces a fast failure notification message that includes information that identifies a network failure, perform the following:
multicast the fast failure notification message according to the shortest path first tree, wherein the fast failure notification message is multicasted to one or more interfaces on the shortest path first tree excluding the receiving interface, and
send the fast failure notification message to the routing protocol module to update the routing table to reflect the network failure;
wherein the FFN module is to multicast the fast failure notification message prior to the routing protocol module completing its update of the routing table to reflect the network failure.

18. The router of claim 17, wherein the address associated with the multicast group is reserved for fast failure notification messages.

19. The router of claim 17, wherein the fast failure notification message has a format that is protocol independent.

20. The router of claim 17, wherein the fast failure notification message has an IGP PDU (Interior Gateway Protocol Protocol Data Unit) packet format that is specific to a particular IGP routing protocol.

21. A method in a router for participating in fast flooding based fast convergence to recover from a network failure, the method comprising the steps of:
building a bidirectional multicast tree using a PIM (Protocol Independent Multicast) protocol implementation;
joining a multicast group;
receiving, on an interface of the router, a fast failure notification message that includes information that identifies a network failure, wherein the first fast failure notification message is addressed to an address associated with the multicast group;
multicasting the fast failure notification message according to the bidirectional multicast tree, wherein the fast failure notification message is multicasted to one or more interfaces on the bidirectional multicast tree excluding the receiving interface; and
updating a routing table of the router to reflect the network failure;
wherein the step of multicasting the fast failure notification message according to the bidirectional multicast tree is performed prior to completion of the step of updating the routing table to reflect the network failure.

22. The method of claim 21, further comprising the steps of:
downloading the bidirectional multicast tree to a data transport layer of the router;
wherein the step of multicasting the first failure notification message according to the bidirectional multicast tree is performed at the data transport layer without interaction from an application layer of the router.

23. The method of claim 21, wherein the address associated with the multicast group is reserved for fast failure notification messages.

24. The method of claim 21, wherein the fast failure notification message has a format that is protocol independent.

25. The method of claim 21, wherein the fast failure notification message has an IGP PDU (Interior Gateway Protocol Protocol Data Unit) packet format that is specific to a particular IGP routing protocol.

26. The method of claim 22, wherein the step of updating the routing table is performed by the application layer of the router.

27. A router to participate in fast flooding based fast convergence to recover from a network failure, the router comprising:
   an application layer entity including a routing protocol module configured to manage a routing table; and
   a data transport layer entity including:
      a plurality of interfaces to couple the router with a plurality of other routers,
      a bidirectional multicast tree built using a PIM (Protocol Independent Multicast) protocol implementation,
      a Fast Failure Notification (FFN) module that is configured to, in response to receipt at one of the plurality of interfaces a fast failure notification message that includes information that identifies a network failure, perform the following:
         multicast the fast failure notification message according to the bidirectional multicast tree, wherein the fast failure notification message is multicasted to one or more interfaces on the bidirectional multicast tree excluding the receiving interface, and
         send the fast failure notification message to the routing protocol module to update the routing table to reflect the network failure;
      wherein the FFN module is to multicast the fast failure notification message prior to the routing protocol module completing its update of the routing table to reflect the network failure.

28. The router of claim 27, wherein the address associated with the multicast group is reserved for fast failure notification messages.

29. The router of claim 27, wherein the fast failure notification message has a format that is protocol independent.

30. The router of claim 27, wherein the fast failure notification message has an IGP PDU (Interior Gateway Protocol Protocol Data Unit) packet format that is specific to a particular IGP routing protocol.

* * * * *

UNITED STATES PATENT AND TRADEMARK OFFICE
CERTIFICATE OF CORRECTION

PATENT NO. : 8,804,489 B2  Page 1 of 1
APPLICATION NO. : 13/091081
DATED : August 12, 2014
INVENTOR(S) : Lu et al.

It is certified that error appears in the above-identified patent and that said Letters Patent is hereby corrected as shown below:

In the Specification

In Column 10, Line 46, delete "message 220A," and insert -- message 264, --, therefor.

Signed and Sealed this
Fourth Day of August, 2015

Michelle K. Lee
*Director of the United States Patent and Trademark Office*